(12) United States Patent
Deshpande

(10) Patent No.: US 12,197,590 B1
(45) Date of Patent: Jan. 14, 2025

(54) HIERARCHICAL RISK SCORING FOR SAAS APPLICATIONS

(71) Applicant: Netskope, Inc., Santa Clara, CA (US)

(72) Inventor: Prahalad Deshpande, Maharashtra (IN)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/426,038

(22) Filed: Jan. 29, 2024

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .................. G06F 21/577; G06F 2221/033
See application file for complete search history.

(56) References Cited

U.S. PATENT DOCUMENTS

| | | |
|---|---|---|
| 5,440,723 A | 8/1995 | Arnold et al. |
| 6,513,122 B1 | 1/2003 | Magdych et al. |
| 6,622,248 B1 | 9/2003 | Hirai |
| 7,080,408 B1 | 7/2006 | Pak et al. |
| 7,298,864 B2 | 11/2007 | Jones |
| 7,376,719 B1 | 5/2008 | Shafer et al. |
| 7,735,116 B1 | 6/2010 | Gauvin |
| 7,966,654 B2 | 6/2011 | Crawford |
| 8,000,329 B2 | 8/2011 | Fendick et al. |
| 8,296,178 B2 | 10/2012 | Hudis et al. |
| 8,793,151 B2 | 7/2014 | DelZoppo et al. |
| 8,839,417 B1 | 9/2014 | Jordan |
| 9,197,601 B2 | 11/2015 | Pasdar |
| 9,225,734 B1 | 12/2015 | Hastings |
| 9,231,968 B2 | 1/2016 | Fang et al. |
| 9,280,678 B2 | 3/2016 | Redberg |
| 9,591,016 B1 | 3/2017 | Palmieri et al. |
| 9,811,662 B2 | 11/2017 | Sharpe et al. |

(Continued)

FOREIGN PATENT DOCUMENTS

EP    1063833 A2    12/2000

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Meng Li
(74) *Attorney, Agent, or Firm* — MUGHAL GAUDRY & FRANKLIN PC

(57) ABSTRACT

A scoring system to assign an exposure metric to a service accessed by multiple end-user devices in an application layer of a cloud-based system. The scoring system includes multiple tenants comprising multiple end-user devices and a scoring server. The scoring server configures dimensions that are functions of the service. The scoring server identifies a resource and determines a resource metric that is a weight of the resource in a dimension. The scoring server further receives a policy and calculates a policy metric that is distance of the policy from origin of a vector space. The scoring server also aggregates the policies and/or the dimensions based on the policy metric, retrieves a dimension metric, and computes the exposure metric for the service. Finally, the scoring server stores the exposure metric of the services and alerts the end-user device about the status of the service.

20 Claims, 16 Drawing Sheets

(56) References Cited

U.S. PATENT DOCUMENTS

| | | | |
|---|---|---|---|
| 10,084,825 | B1 | 9/2018 | Xu |
| 10,091,169 | B2 | 10/2018 | Cohen et al. |
| 10,142,362 | B2 | 11/2018 | Weith et al. |
| 10,235,648 | B2 | 3/2019 | Curcic et al. |
| 10,237,282 | B2 | 3/2019 | Nelson et al. |
| 10,310,884 | B2 * | 6/2019 | Ansari ............... G06F 9/45558 |
| 10,318,740 | B2 | 6/2019 | Toledano et al. |
| 10,334,442 | B2 | 6/2019 | Vaughn et al. |
| 10,382,468 | B2 | 8/2019 | Dods |
| 10,484,334 | B1 | 11/2019 | Lee et al. |
| 10,826,941 | B2 | 11/2020 | Jain et al. |
| 11,032,301 | B2 | 6/2021 | Mandrychenko et al. |
| 11,036,856 | B2 | 6/2021 | Graun et al. |
| 11,070,617 | B2 | 7/2021 | Lee et al. |
| 11,281,775 | B2 | 3/2022 | Burdett et al. |
| 11,290,494 | B2 | 3/2022 | Woolward et al. |
| 11,463,468 | B2 | 10/2022 | Grounds et al. |
| 11,509,681 | B2 | 11/2022 | Parekh et al. |
| 11,663,544 | B2 * | 5/2023 | Zhang .................... G06N 20/00 705/7.28 |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-Lemair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2006/0156401 | A1 | 7/2006 | Newstadt et al. |
| 2007/0204018 | A1 | 8/2007 | Chandra et al. |
| 2007/0237147 | A1 | 10/2007 | Quinn et al. |
| 2008/0069480 | A1 | 3/2008 | Aarabi et al. |
| 2008/0134332 | A1 | 6/2008 | Keohane et al. |
| 2009/0144818 | A1 | 6/2009 | Kumar et al. |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2011/0119481 | A1 | 5/2011 | Auradkar et al. |
| 2011/0145594 | A1 | 6/2011 | Jho et al. |
| 2012/0278896 | A1 | 11/2012 | Fang et al. |
| 2013/0159694 | A1 | 6/2013 | Chiueh et al. |
| 2013/0298190 | A1 | 11/2013 | Sikka et al. |
| 2013/0347085 | A1 | 12/2013 | Hawthorn et al. |
| 2014/0013112 | A1 | 1/2014 | Cidon et al. |
| 2014/0068030 | A1 | 3/2014 | Chambers et al. |
| 2014/0068705 | A1 | 3/2014 | Chambers et al. |
| 2014/0259093 | A1 | 9/2014 | Narayanaswamy et al. |
| 2014/0282843 | A1 | 9/2014 | Buruganahalli et al. |
| 2014/0359282 | A1 | 12/2014 | Shikfa et al. |
| 2014/0366079 | A1 | 12/2014 | Pasdar |
| 2015/0100357 | A1 | 4/2015 | Seese et al. |
| 2016/0323318 | A1 | 11/2016 | Terrill et al. |
| 2016/0323880 | A1 * | 11/2016 | Luo ..................... H04L 41/0896 |
| 2016/0350145 | A1 | 12/2016 | Botzer et al. |
| 2017/0064005 | A1 | 3/2017 | Lee |
| 2017/0093917 | A1 | 3/2017 | Chandra et al. |
| 2017/0250951 | A1 | 8/2017 | Wang et al. |
| 2020/0050686 | A1 | 2/2020 | Kamalapuram et al. |
| 2021/0089363 | A1 * | 3/2021 | Bergsma ............... G06F 9/5027 |
| 2021/0127292 | A1 * | 4/2021 | Van Duren ....... H04W 28/0236 |
| 2021/0409441 | A1 | 12/2021 | Singh et al. |
| 2022/0294818 | A1 | 9/2022 | Parekh et al. |
| 2022/0377098 | A1 * | 11/2022 | Singh ....................... G06N 5/04 |
| 2023/0004445 | A1 | 1/2023 | Bosch et al. |
| 2023/0050771 | A1 | 2/2023 | Chen et al. |
| 2023/0247044 | A1 * | 8/2023 | Luttwak .................. H04L 63/20 726/1 |
| 2023/0269277 | A1 * | 8/2023 | Cirelli ................. H04L 63/101 726/1 |
| 2023/0305944 | A1 * | 9/2023 | Biswas ............... G06F 11/3612 |
| 2023/0333880 | A1 * | 10/2023 | White ................... G06F 9/4881 |
| 2023/0333883 | A1 * | 10/2023 | White ................... G06F 9/4881 |
| 2024/0144141 | A1 * | 5/2024 | Cella ............... G06Q 10/06375 |

OTHER PUBLICATIONS

Huckaby, Jeff Ending Clear Text Protocols, Rackaid.com, Dec. 9, 2008, 3 pgs.

Nevvton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al. "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54.

Zetter, Kim, "Revealed: The Internet's Biggest Security Hole," Wired, Aug. 26, 2008, 13 pgs.

Adya et al., Farsite: Federated, available, and reliable storage for an incompletely trusted environment, SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al. , Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-,What are the different email protocols%3F, and also has defined functions.

NIIT, Special Edition Using Storage Area Networks, Que, 2002, 6 pgs.

Chapple, Mike, "Firewall redundancy: Deployment scenarios and benefits," Tech Target, 2005, 5 pgs. available at https://www.techtarget.com/searchsecurity/tip/Firewall-redundancy-Deployment-scenarios-and-benefits?%20Offer=abt_pubpro_Al-Insider.

Fortinet, FortiGate—3600 User Manual (vol. 1 , Version 2.50 MR2) Sep. 5, 2003, 329 pgs.

Fortinet, FortiGate SOHO and SMB Configuration Example, (Version 3.0 MR5), Aug. 24, 2007, 54 pgs.

Fortinet, FortiSandbox—Administration Guide, (Version 2.3.2), Nov. 9, 2016, 191 pgs.

Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.

Fortinet,FortiOS- Administration Guide, (Versions 6.4.0), Jun. 3, 2021, 1638 pgs.

Heady et al., "The Architecture of a Network Level Intrusion Detection System," University of New Mexico, Aug. 15, 1990, 21 pgs.

Kephart et al., "Fighting Computer Viruses," Scientific American (vol. 277, No. 5) Nov. 1997, pp. 88-93.

Wang, L., Chapter 5: Cooperative Security in D2D Communications, "Physical Layer Security in Wireless Cooperative Networks," 41 pgs. first online on Sep. 1, 2017 at https://link.springer.com/chapter/%2010.1007/978-3-319-61863-0_5.

(56) References Cited

OTHER PUBLICATIONS

Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al. "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

\* cited by examiner

HIERARCHICAL RISK SCORING FOR SAAS APPLICATIONS

BACKGROUND

This disclosure relates, in general, to internet security systems and, not by way of limitation, to the classification of applications, among other things.

Saas (Software as a Service) applications, while famous for their ease of deployment and scalability, are not immune to vulnerabilities, which rogue actors may exploit to compromise the security of a system. Security vulnerabilities within SaaS applications include but are not limited to data breaches, identity and access management (IAM) issues, and weak encryption, resulting in data theft and compromising its encryption security.

The disadvantages caused by these vulnerabilities are numerous, encompassing data loss and downtime, which can disrupt business operations and harm finances, and intellectual property theft. The damage to reputation can result in losing customers who assign high priority to data security and privacy. It also can result in non-compliance with the data governance and security standards, which may start litigation, resulting in heavy fines. Users also have limited control over security measures for SaaS applications that require resource-intensive security systems.

Strategies such as regular security audits, access control, data encryption, compliance adherence, incident response planning, vendor assessment, and security education and training are currently used.

SUMMARY

In one embodiment, the present disclosure provides a scoring system to assign an exposure metric to a service accessed by multiple end-user devices in an application layer of a cloud-based system. The scoring system includes multiple tenants comprising multiple end-user devices and a scoring server. The scoring server configures dimensions that are functions of the service. The scoring server identifies a resource and determines a resource metric that is a weight of the resource in a dimension. The scoring server further receives a policy and calculates a policy metric that is distance of the policy from origin of a vector space. The scoring server also aggregates the policies and/or the dimensions based on the policy metric, retrieves a dimension metric, and computes the exposure metric for the service. Finally, the scoring server stores the exposure metric of the services and alerts the end-user device about status of the service.

In an embodiment, a scoring system to assign an exposure metric to a service accessed by multiple end-user devices in an application layer of a cloud-based system. The scoring system includes multiple tenants, comprising of multiple end-user devices, and a scoring server. The scoring server configures dimensions that are functions of the service. The dimensions are configured by a client and/or a vendor of the service. The scoring server identifies a resource present at an end-user device of a tenant or in a cloud application and determines a resource metric that is a weight of the resource in a dimension. The resource within the end-user device or in a cloud application is a component, functionality, and/or data that is accessed by the services. The scoring server further receives a policy and calculates a policy metric that is distance of a point from origin of a multi-dimensional vector space. The point represents the policy in the multi-dimensional vector space. The scoring server also aggregates the policies and/or the dimensions based on the policy metric, retrieves a dimension metric, and computes the exposure metric for the service. The dimension metric signifies a vector in the multi-dimensional vector space and the exposure metric tells a status of the service. Finally, the scoring server stores the exposure metric of the services and alerts the end-user device about the status of the service. The status of the service indicates the stability or instability of the service.

In another embodiment, a scoring method for assigning an exposure metric to a service accessed by multiple end-user devices belonging to a tenant of multiple tenants in an application layer of a cloud-based system. In one step, the scoring method involves configuring dimensions that are functions of the service. The dimensions are configured by a client and/or a vendor of the service. The scoring method involves identifying a resource present at an end-user device of a tenant or in a cloud application and determining a resource metric that is a weight of the resource in a dimension. The resource within the end-user device or in a cloud application is a component, functionality, and/or data that is accessed by the services. The scoring method further comprises receiving a policy and calculating a policy metric that is distance of a point from origin of a multi-dimensional vector space. The point represents the policy in the multi-dimensional vector space. The scoring method also includes aggregating the policies and/or the dimensions based on the policy metric, retrieving a dimension metric, and computing the exposure metric for the service. The dimension metric signifies a vector in the multi-dimensional vector space and the exposure metric tells a status of the service. Finally, the scoring method includes storing the exposure metric of the services and alerting the end-user device about the status of the service. The status of the service indicates the stability or instability of the service.

In yet another embodiment, a computer-readable media is discussed having computer-executable instructions embodied thereon that when executed by one or more processors, facilitate scoring method for assigning an exposure metric to a service accessed by multiple end-user devices belonging to a tenant of multiple tenants in an application layer of a cloud-based system. The scoring method involves configuring dimensions that are functions of the service. The dimensions are configured by a client and/or a vendor of the service. The scoring method involves identifying a resource present at an end-user device of a tenant or in a cloud application and determining a resource metric that is a weight of the resource in a dimension. The resource within the end-user device or in a cloud application is a component, functionality, and/or data that is accessed by the services. The scoring method further comprises receiving a policy and calculating a policy metric that is distance of a point from origin of a multi-dimensional vector space. The point represents the policy in the multi-dimensional vector space. The scoring method also includes aggregating the policies and/or the dimensions based on the policy metric, retrieving a dimension metric, and computing the exposure metric for the service. The dimension metric signifies a vector in the multi-dimensional vector space and the exposure metric tells a status of the service. Finally, the scoring method includes storing the exposure metric of the services and alerting the end-user device about the status of the service. The status of the service indicates the stability or instability of the service.

Further areas of applicability of the present disclosure will become apparent from the detailed description provided hereinafter. It should be understood that the detailed description and specific examples, while indicating various embodiments, are intended for the purpose of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1A:
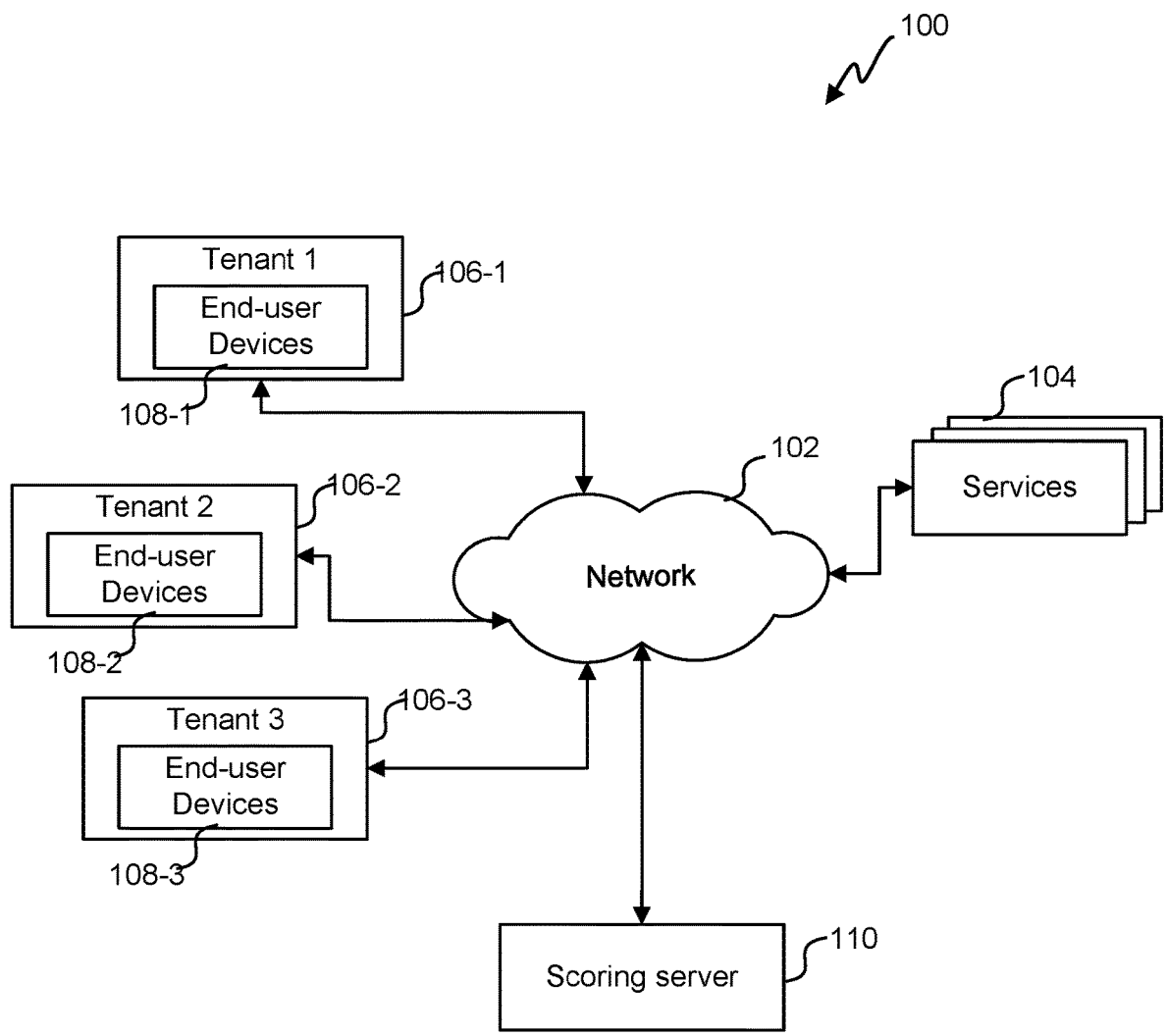
FIGS. 1A-1B illustrates a block diagram of an embodiment of a scoring system in a cloud-based multi-tenant system/environment.

Referring to FIG. 1A, a block diagram of an embodiment of a scoring system 100 in a cloud-based multi-tenant system/environment is shown. A multi-tenant environment helps handle security, quality of service compliance, service level agreement enforcement, service request metering, and other management activities relating to the scoring system 100. The scoring system includes a network 102, services 104, tenants 106 (106-1, 106-2, 106-3), end-user devices 108 (108-1, 108-2, 108-3), and a scoring server 110. The network 102 is any Internet network connecting tenants 106, the scoring server 110, and the services 104. The services 104 are software solutions that are local applications, or SaaS which are hosted and maintained by third-party vendors/cloud providers and provided to the end-user devices 108 over the network 102, such as the Internet. The services 104 can also be hosted within the data center of an enterprise. The end-user device 108 uses content and processing for content sites, for example, websites, streaming content, etc., and the services 104, for example, SaaS tools, databases, cloud service providers, etc. The terms "services" and "applications" are used interchangeably in this application.

The tenants 106 contain multiple end-user devices 108 that access the services 104. The end-user devices 108, including a cloud application or subscription that is owned or accessible to the user and other physical devices, such as smartphones, tablets, personal computers (PCs), and many other computers, communicate with the services 104 using the network 102. The end-user devices 108 runs on any popular operating system (OS) such as Windows™, iOS™, Android™, Linux, set-top box OSes, and Chromebook™. The scoring server 110 evaluates the service 104 in accordance with policies in a dimension of the service 104 and assigns an exposure metric to indicate the status of the service 104. The dimensions are different features provided by the service 104. Policies in one dimension for a user may differ from policies in another dimension for the same or a different user. Each dimension within a multi-dimensional vector space has its dimension metric. For example, consider an arbitrary cloud application (CA) that performs the following activities:

1) Accesses user-authored documents that are present in an online storage system, like Box™/OneDrive™, and summarizes them. The summarization process happens by sending the content of the document to the cloud service hosted by the vendor of CA;
2) Queries a list of users from the same department using a lightweight directory access protocol (LDAP), and automatically broadcasts a message to the users about the availability of a new document;
3) Alters the policies of the document so that the users can review/edit the document.

Examining the set of activities above, the CA has the risks in the following dimensions:
1) Data Access—The CA accesses the files associated with the user as well as the LDAP properties associated with the user and the enterprise to which the user belongs;
2) Network data transfer—The CA transfers data over the network to another service/$3^{rd}$ party cloud service;
3) Authorization—The CA alters the policies of the documents to add/remove viewers.

There may be other dimensions also to be considered—for example, vendor reputation, data availability guarantees, etc.

The scoring server 110 takes multiple dimensions into account while calculating the exposure metric. The scoring server 110 rates the service 104 in the multi-dimensional vector space where the weight of a resource and the policies vary in different dimensions of the multi-dimensional vector space. The details of the scoring techniques/algorithm shall be explained in the application later. The scoring server 110 is further used to classify a new service, to find similarities between two or more services, and to recommend one service over the other.

Figure 1B:
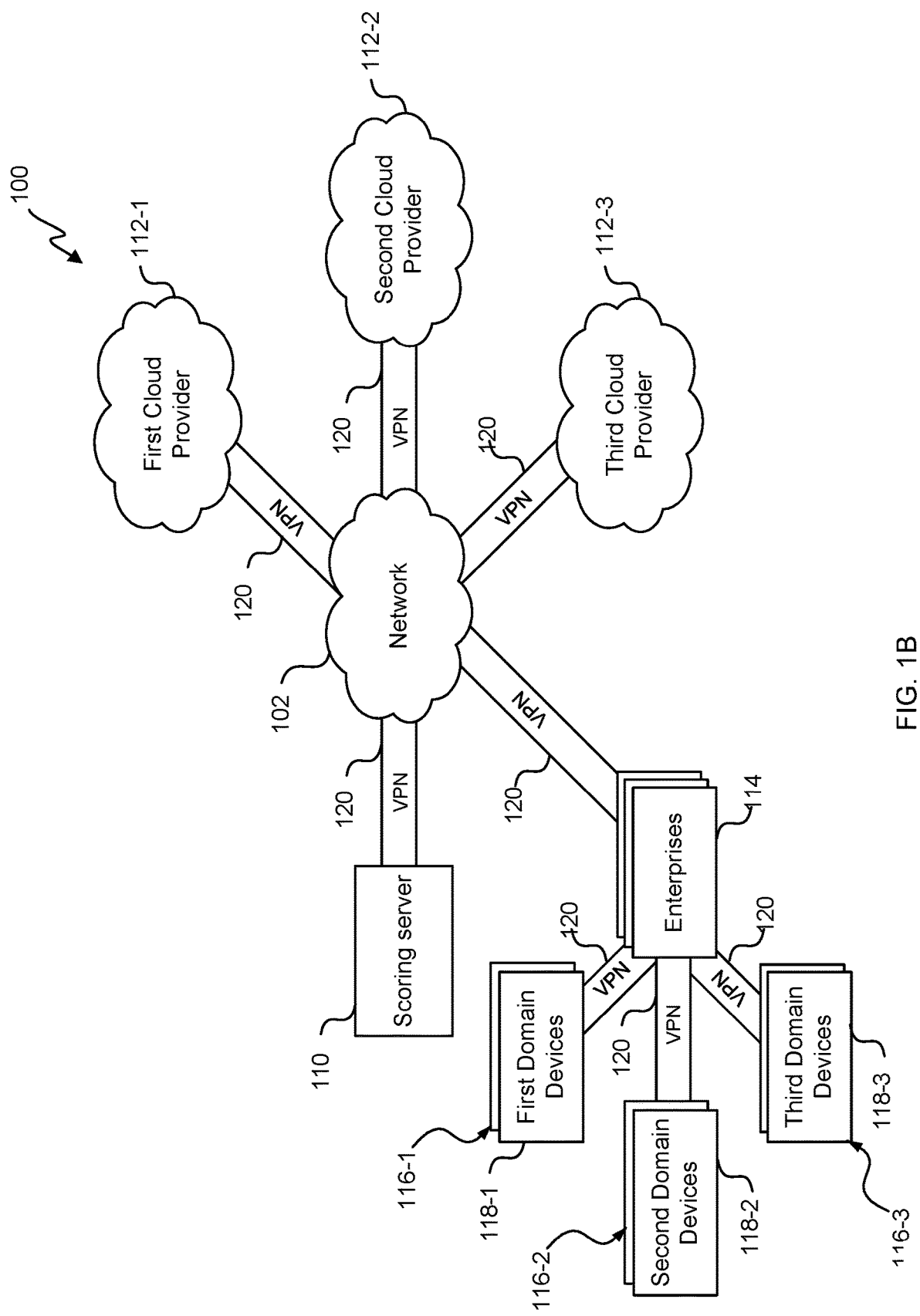

Referring to FIG. 1B, a block diagram of an embodiment of the scoring system 100 is shown. The scoring system 100 allows multiple tenants in different domains to communicate with various cloud providers over the network 102. The scoring system 100 may be a multi-tenant cloud-based system or a single-tenant cloud-based system. The scoring system 100 includes multiple servers. The scoring system 100 allows multiple tenants/multi-tenant systems or enterprises 114 to use the same network separated by a domain or some other logical separation. Encryption, leased/encrypted tunnels, firewalls, and/or gateways can be used to keep the data from one enterprise 114 separate from the other enterprise 114. The scoring server 110 provides multi-tenancy control, policies, and service scoring for individual domain data centers.

The scoring system 100 may include a first computing environment 116-1 having end-user devices for a first domain 118-1, a second computing environment 116-2 having end-user devices for a second domain 118-2, and a third computing environment 116-3 having end-user devices for a third domain 118-3. Individual domain communicates with the enterprise 114 using a virtual private network (VPN) 120 over local area networks (LANs), wide area networks (WANs), and/or the network 102. Instead of the VPN 120 as an end-to-end path, tunneling (e.g., Internet Protocol in Internet Protocol (IP-in-IP), Generic Routing Encapsulation (GRE)), policy-based routing (PBR), Border Gateway Protocol (BGP)/Interior Gateway Protocol (IGP) route injection, or proxies could be used. Cloud providers 112 for offering remote services may include public or private clouds including Web/Software as a service (SaaS), and voice/video connected to the scoring server 110 via VPN 120.

Enterprises 114 are connected to the scoring server 110 using the VPN 120 over the network 102. Some examples of the cloud providers 112 include Amazon Web Services (AWS)®, Google Cloud Platform (GCP)®, and Microsoft Azure®. The applications provided by the cloud providers 112 include Office 365®, Box™, Zoom™, and Salesforce™ etc. With the cloud application providers, the user subscribes to a set of services provided by these application providers, and the scoring system 100 ranks the services 104 or applications hosted within the cloud providers 112. Some or all of the cloud providers 112 may be different from each other, for example, the first cloud provider 112-1 may run Amazon Web Services (AWS)®, the second cloud provider 112-2 may run Google Cloud Platform (GCP)®, and the third cloud provider 112-3 may run Microsoft Azure®. Although three cloud providers 112 are shown, any suitable number of cloud providers 112 may be provided that might be strictly captive to a particular enterprise or otherwise not accessible to multiple domains.

Each of the cloud providers 112 may communicate with the network 102 using a secure connection. For example, the first cloud provider 112-1 may communicate with the network 102 via the VPN 120, the second cloud provider 112-2 may communicate with the network 102 via a different VPN, and the third cloud provider 112-3 may communicate with the network 102 via yet another VPN. Some embodiments could use leased connections or physically separated connections to segregate traffic. Although one VPN is shown, it is to be understood that there are many VPNs to support different end-user devices, tenants, domains, etc.

Enterprises 114 may also communicate with the network 102 and the end-user devices 108 for their domain via VPNs 120. Some examples of the enterprises 114 may include corporations, educational facilities, governmental entities, and private consumers. Each enterprise may support one or more domains to logically separate its networks. The end-user devices 108 for each domain may include individual computers, tablets, servers, handhelds, and network infrastructure that are authorized to use computing resources of their respective enterprises.

Further, the scoring server 110 may communicate with the network 102 via the VPN 120. The scoring server 110 may also provide SaaS security posture management (SSPM) functionality for cloud security to the enterprises 114 with data flows of the SSPM being regulated with a global cloud traffic controller (GCTC). Communication between the scoring server 110 and the cloud providers 112 (cloud application providers) for a given enterprise 114 can be either a VPN connection or tunnel depending on the preference of the enterprise 114. The scoring server 110 assigns the exposure metric to the service 104 and notifies users about the status of the service 104. The status of the service 104 describes the stability or instability of the service 104. The scoring server 110 also calculates a similarity metric that indicates whether two or more services are similar or not regarding their risk impact. The scoring server 110 can also classify new services/applications and recommend one application over the other. The connection between the tenants 106 and the scoring server 110 is over an encrypted VPN 120 or tunnel.

Figure 2:
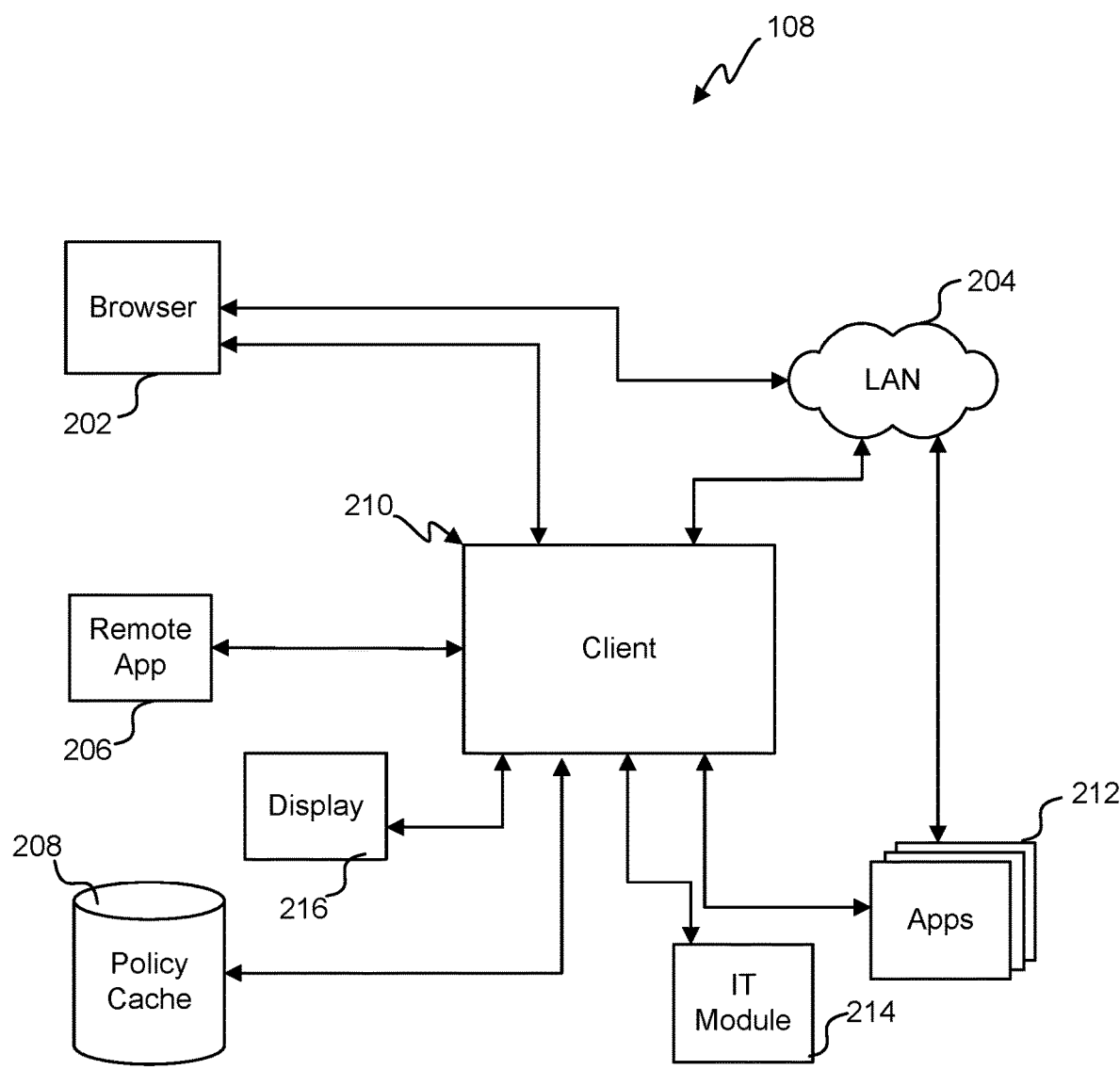
FIG. 2 illustrates a block diagram of an embodiment of an end-user device that includes a client for accessing a service.

Referring next to FIG. 2, a block diagram of an embodiment of the end-user device 108 that includes a client 210 for accessing the service 104 is shown. The end-user device 108 includes applications (apps) 212 and a browser 202 that use the client 210 for communication over the LAN 204 and in due course to the cloud providers 140 (not shown). The browser 202 and the apps 212 can be redirected using domain name services (DNS) to use the client 210. Alternatively, the browser 202 and the apps 212 may natively support the client 210 to utilize Application Programming Interfaces (APIs) or other communication to select policies, and rules and engage with content on the services 104. The policies dictate the scope and access of each user or the client 210 of the end-user devices 108. These policies are stored in a policy cache 208 of the end-user devices 108. A remote app 206 is used to access a remote application on a remote instance of a remote server on the end-user devices 108.

The end-user devices 108 also contain resources that are possessions of the tenants 106, on which the apps 212 are running. The resource is a component, functionality and/or data that is present at the end-user device 108 or cloud subscriptions owned by the end-user devices 108. The resources are accessed by the services 104 for their functioning. Some examples of the resources include Central Processing Unit (CPU) cores, memory, disk space, and different servers available at the end-user devices 108. The service 104 uses the policies associated with different dimensions of the service 104 to access the resources of the end-user devices 108. The dimensions and the policies associated with them are displayed to the users or the client 210 requesting a display 216. At the display 216, the dimensions of the service 104 and the policies can be configured. The configuration of the dimensions and the policies can be done by the client 210, the enterprise 114, and/or by the vendor of the services 104. The configuration of the dimensions includes pinning a specific dimension, introducing a new dimension, excluding the dimension and/or modifying (changing weights) of the dimensions.

An Information Technology (IT) module 214 is used by the client 210 to provide any feedback related to the dimension configuration and service classification. The feedback is provided to an administrator of the enterprises 114 of the client 210. The feedback may include changes in policies or changes in the dimensions and thresholds. The display 216 provides configuration of dimensions and policies and asks for suggestions and/or feedback, which may be provided to the IT module 214.

Figure 3:
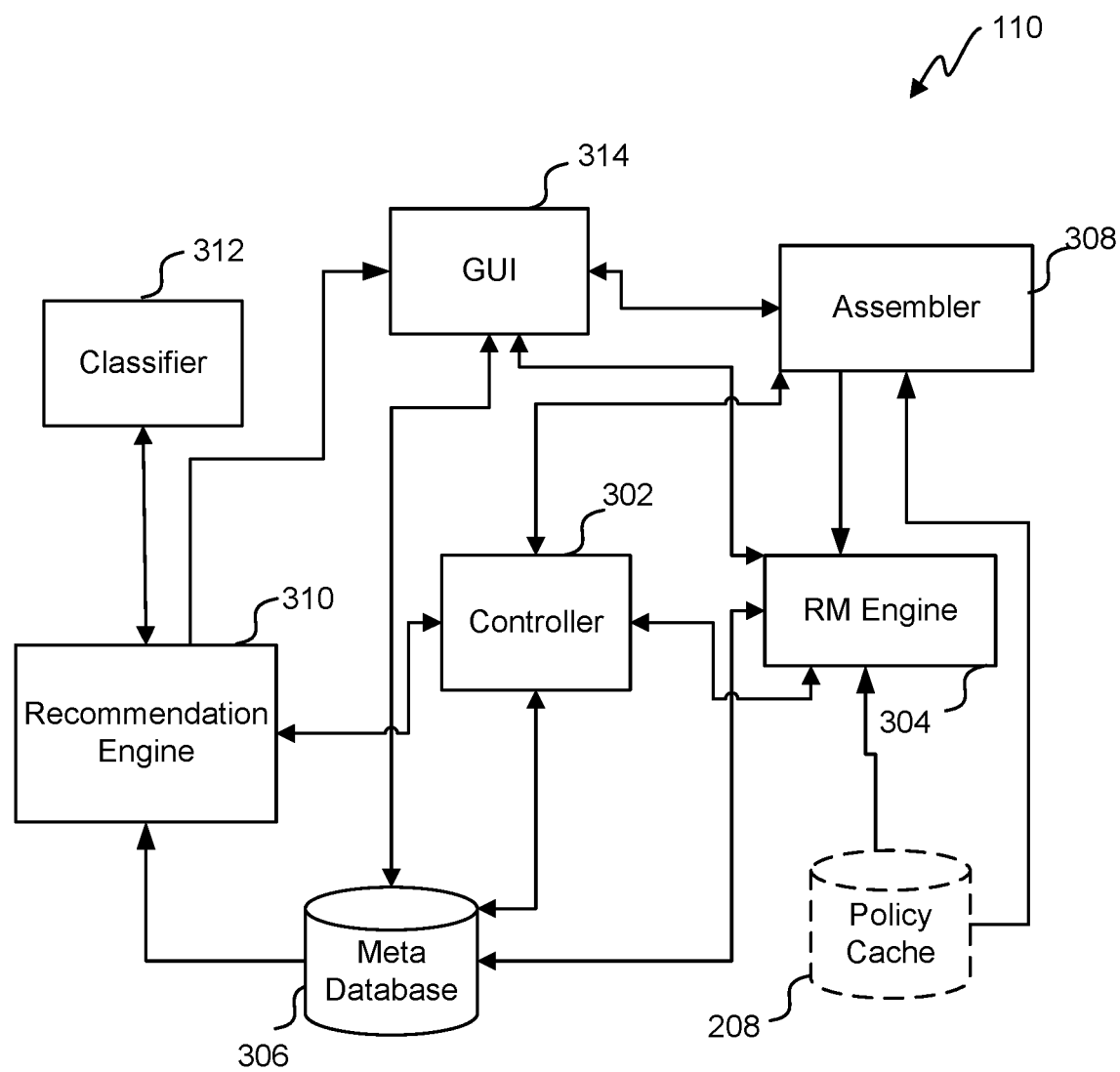
FIG. 3 illustrates a block diagram of an embodiment of a scoring server.

Referring next to FIG. 3, a block diagram of an embodiment of the scoring server 110 is shown. The scoring server 110 contains a controller 302, a risk magnitude (RM) engine 304, a meta database 306, an assembler 308, a recommendation engine 310, a classifier 312, and a graphical user interface (GUI) 314. The scoring server 110 is employed to configure the dimensions of the service 104, identify the resources, and determine a resource metric. The scoring server 110 further receives policies of the end-user devices 108 and calculates a policy metric. The scoring server 110 also aggregates the dimensions and/or the policies according to a hierarchy, retrieves a dimension metric, and then computes the exposure metric of the service 104. Finally, the scoring server 110 stores the exposure metric and notifies the end-user devices 108 about the stability or instability of the services 104.

The controller 302 manages the components of the scoring server 110. The controller 302 arranges the dimensions and resources of the scoring system 100 with their associated metrics in the meta database 306. The RM engine 304 calculates the policy metric, the resource metric, and the exposure metric. Based on the exposure metric, the status of the service 104 is determined by the controller 302. The meta database 306 stores the dimensions, the resources, the policy metric, the dimension metric, the resource metric, and the exposure metric of the services 104.

The assembler 308 creates the hierarchy for multi-dimensional scoring of the services 104. The hierarchy can be intra-dimensional or inter-dimensional. In the inter-dimensional hierarchy, the assembler 308 aggregates the dimensions with higher dimension metrics so that such dimensions supersede the dimensions with lower dimension metrics. The dimension graph is topologically sorted, and the dimension metric associated with the first dimension in the sorted set can be the dimension metric for that dimension hierarchy. Here, the dimension metric represents a risk score associated with the dimension of the service. Suppose that the dimension of the service 104 is a vector in a vector space. When multiple dimensions of the service 104 are considered, it creates the multi-dimensional vector space. So, the dimension metric is the vector in the multi-dimensional vector space, indicating the risk associated with that dimension.

The service 104 can have all kinds of dimensions depending upon the functionality of the service. The dimension metrics represent the risk impact of the service 104 in that dimension. For example, the dimension "user profiles" of the service 104 contains all the information related to the users in the enterprise 114. The user profiles contain user entity behavior analysis (UEBA), the policies of the user, and how well he is complying with those policies etc. The dimension metric of the user with a good activity record will be higher than others. Another example of the dimensions can be the "vendor reputation" dimension. Suppose the service 104 has remarkable policy metrics and resource metrics in other dimensions but a less reputed vendor is offering it. So, the scoring server 110 will assign a lesser dimension metric to the vendor reputation dimension only. As a result, the vendor reputation dimension will go down in the inter-dimensional hierarchy.

Similarly, in the intra-dimensional hierarchy, the assembler 308 aggregates the policies with higher policy metrics so that such policies supersede the policies with a lower policy metric. The hierarchy graph is topologically sorted, and the policy metric associated with the top-most node in the hierarchy represents the risk associated with that dimension. Here, the policy represents a point in the multi-dimensional vector space and the policy metric represents the distance of that point from the origin of the multi-dimensional vector space. The policy metric indicates the risk associated with the policy in one of the dimensions of the service 104. The policy metric for the same client may vary across different dimensions of the same service.

The recommendation engine 310 is used to suggest one application/service over the other to the client 210 at the end-user devices 108. The recommendation engine 310 makes use of the exposure metrics of the previously evaluated services 104 that are similar in functionality to each other. The recommendation engine 310 may use a machine learning algorithm or any intelligence technique to provide suggestions to the client 210. In an application layer of the cloud, this feature is helpful as it saves time and data and maintains security of the network 102.

The classifier 312 compares the exposure metrics of two or more services to determine if they are similar or not. The similarity metric is calculated by finding the Euclidean distance between the exposure metric of two or more services 104. The similarity metric is then compared against a pre-defined threshold. If the similarity metric is lesser than the threshold, then the two services are assumed to be similar. The threshold varies for different dimensions of the two or more services 104. The classifier 312 also uses vectorized classification techniques such as support vector machines (SVMs) to automatically classify unknown services based on the exposure metrics and the status of previously known services. In this way, the scoring system 100 uses fewer computational resources and saves time by automatically classifying new services.

The GUI 314 displays the exposure metric, the similarity metric, and status among other pieces of information of the service 104 to the end-user devices 108. The list of resources, dimensions, and policies can also be seen in the GUI 314. The GUI 314 may also depict graphical representations of the inter-dimensional and/or the intra-dimensional hierarchy. In such cases, the entire policy set associated with a particular dimension of the service 104 can be represented as a graph with an edge between a policy and the policies it supersedes.

Figure 4:
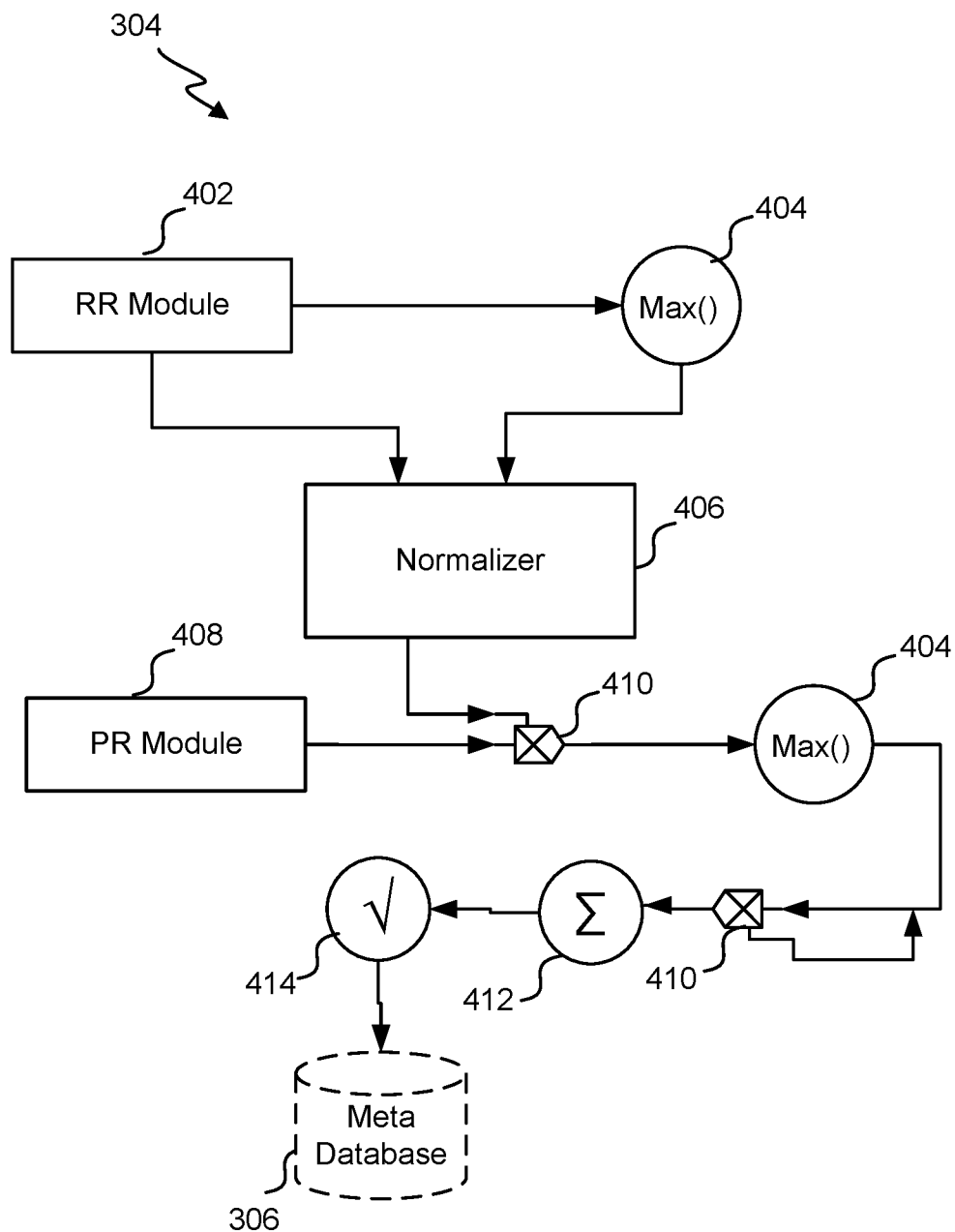
FIG. 4 illustrates a block diagram of an embodiment of an RM engine of the scoring server.

Referring next to FIG. 4, a block diagram of an embodiment of the RM engine 304 of the scoring server 110 is shown. The RM engine 304 computes the exposure metric for the service 104 which entails various policies to access different resources within the tenant 106. The RM engine 304 contains a resource risk (RR) module 402, a max( ) function 404, a normalizer 406, and a policy risk (PR) module 408. The RM engine further contains a multiplier 410, a summation function 412, and a squared root function 414. Before calculating the exposure metric, some core invariant assumptions for the scoring system 100 are to be considered. The assumptions are:

1) A service A may contain one or more policies for the resource;
2) Service A may request policies across a multitude of resources;

3) Each of the policies represents a point whose distance from the origin is equal to the risk score of the permission, or the policy metric;
4) Each resource has an associated risk score called the resource metric, which signifies the weight of the resource relative to other resources. For example, an LDAP Directory Resource has a higher weight than an Email Resource;
5) The exposure metric or the risk associated with the service 104 can be calculated at various levels. For example, Resource Level, Access Pattern Level, Behavior Level etc. at each level, the mechanics of calculating the exposure metric remain the same;
6) The exposure metric indicates a risk magnitude considering a set of weighted dimension metrics across each dimension that the risk manifests in;
7) The exposure metric of the service 104 is always positive;
8) The exposure metric of the service 104 ranges between 0 to 100.

Starting with the scoring technique of the exposure metric, let R be the set of the resources. Let P be the set of policies. The RM engine 304 receives both sets from the controller 302. The RR module 402 determines the resource metric (RR) associated with each dimension in N dimensions. The resource metric (RR) indicates the risk scores of the resources in N dimensions. Let RR=[rr1, rr2, rr3, . . . , rrn],
where rr is the resource metric of one of the multiple resources at the end-user devices 108. The max( ) function 404 finds the largest value of the resource metric (RR) from the above equation. For each dimension, the normalizer 406 stabilizes the resource metric in that dimension using the formula:

$$NRS = \frac{rr}{(RR)} \forall\, rr \in RR \qquad \text{Eq. 1}$$

where NRS is a normalized risk score across the dimensions. The PR module 408 determines the policy metric (PR) associated with each dimension in N dimensions. The policy metric (PR) indicates the risk scores associated with each of the point resident within one of the N dimensions.

Let PR=[pr1, pr2, pr3, . . . , prn], where pr is the policy metric of one of the multiple policies of the end-user devices 108. In sum, each policy P is associated with resource R and has a corresponding policy metric and resource metric in each of the N dimensions. The RM engine 304 then calculates a weighted risk score (WRS) for each point/policy in one of the N dimensions. For this purpose, the multiplier 410 is used. The following formula calculates the weighted risk score (WRS):

$$WRS = pri * \text{nrsi} \sqrt{ielen(NRS)} \qquad \text{Eq.2}$$

The max( ) function 404 finds the largest value of the WRS in each dimension of the service 104. The multiplier 410 then gives the product of the maximum value of the WRS with itself. All the squared values are added together using the summation function 412. In the end, the squared root function 414 is used to compute the exposure metric. So, the exposure metric is determined by taking the square root of the sum of squares of maxed weighted risk scores in each of the dimensions of the service 104. The exposure metric is given as:

$$\text{Exposure Metric} = \sqrt{x_1^2 + x_2^2 + \ldots + x_n^2}, \qquad \text{Eq.3}$$

where $x_1, x_2, \ldots, x_n$, are the maxed weighted risk scores across the N dimensions of the service 104. At the end, the RM engine 304 sends the exposure metrics of each of the services 104 to the meta database 306.

The controller 302 then decides the status of the service 104 based on its exposure metric. The status of the service 104 informs the client 210 of the end-user devices 108 or the tenants 106 which service is safe to use, and which one is not. The threshold for determining if the service 104 is stable or not varies for each case as it depends on what policies, dimensions, and resources are selected for the service 104.

Figure 5:
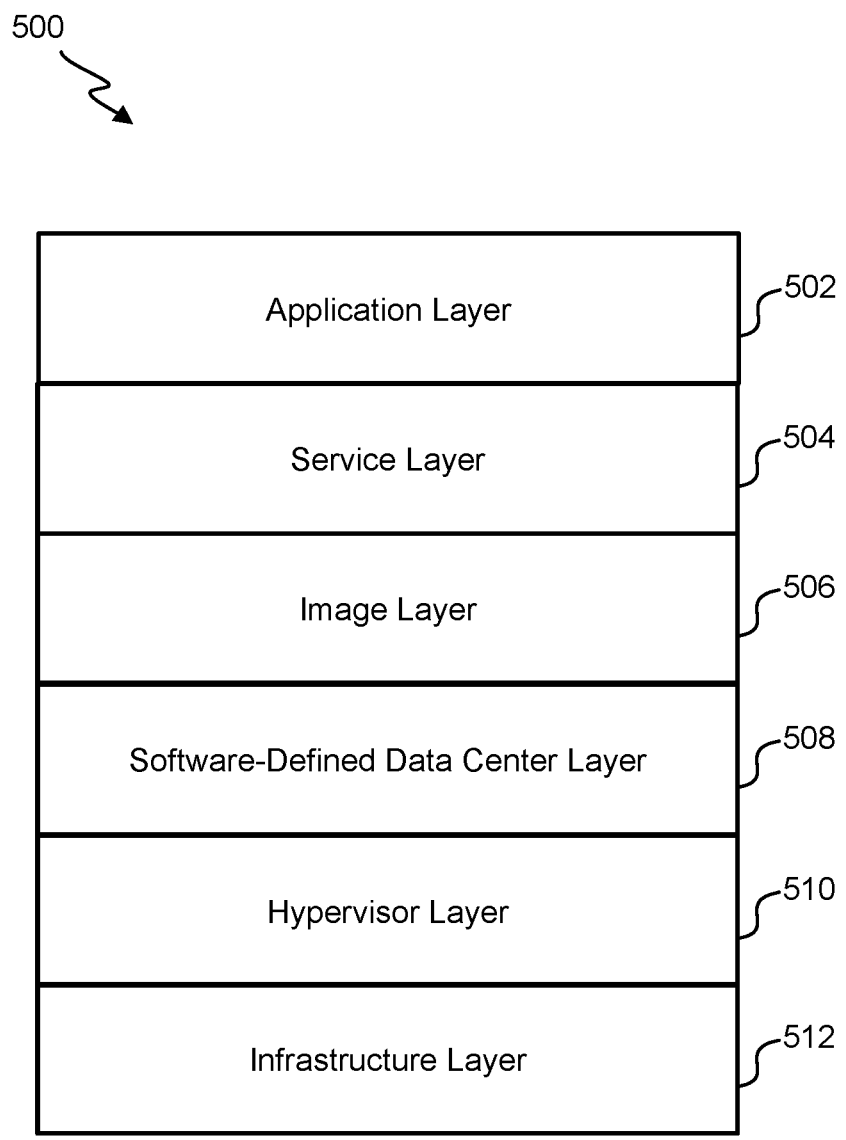
FIG. 5 illustrates a block diagram of an embodiment of an OSI model.

Referring next to FIG. 5, a block diagram of an embodiment of a cloud open systems interconnection (OSI) model 500 is shown. The cloud OSI model 500 for cloud computing environments partitions the flow of data in a communication system into six layers of abstraction. The cloud OSI model 500 for cloud computing environments can include, in order: the application layer 502, a service layer 504, an image layer 506, a software-defined data center layer 508, a hypervisor layer 510, and an infrastructure layer 512. The respective layer serves a class of functionality to the layer above it and is served by the layer below it. Classes of functionality can be realized in software by various communication protocols.

The infrastructure layer 512 can include hardware, such as physical devices in a data center, that provides the foundation for the rest of the layers. The infrastructure layer 512 can transmit and receive unstructured raw data between a device and a physical transmission medium. For example, the infrastructure layer 512 can convert the digital bits into electrical, radio, or optical signals.

The hypervisor layer 510 can perform virtualization, which can permit the physical devices to be divided into virtual machines that can be bin-packed onto physical machines for greater efficiency. The hypervisor layer 510 can provide virtualized computing, storage, and networking. For example, OpenStack® software that is installed on bare metal servers in a data center can provide virtualization cloud capabilities. The OpenStack® software can provide various infrastructure management capabilities to cloud operators and administrators and can utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 508 can provide resource pooling, usage tracking, and governance on top of the hypervisor layer 510. The software-defined data center layer 508 can enable the creation of virtualization for the Infrastructure-as-Code concept by using representational state transfer (REST) APIs. The management of block storage devices can be virtualized, and end-users can be provided with a self-service API to request and consume those resources which do not entail any knowledge of where the storage is deployed or on what type of device. Various compute nodes can be balanced for storage.

The image layer 506 can use various operating systems and other pre-installed software components. Patch management can be used to identify, acquire, install, and verify patches for products and systems. Patches can be used to rectify security and functionality problems in software. Patches can also be used to add new features to operating systems, including security capabilities. The image layer 506 can focus on the computing in place of storage and networking. The instances within the cloud computing environments can be provided at the image layer 506.

The service layer 504 can provide middleware, such as functional components that applications use in tiers. In some examples, the middleware components can include databases, load balancers, web servers, message queues, email services, or other notification methods. The middleware components can be defined at the service layer 504 on top of specific images from the image layer 506. Different cloud computing environment providers can have different middleware components. The application layer 502 can interact with software applications that implement a communicating component. The application layer 502 is the layer that is closest to the end-user. Functions of the application layer 502 can include identifying communication partners, determining resource availability, and synchronizing communications. Applications within the application layer 502 can include custom code that makes use of middleware defined in the service layer 504.

Various features discussed above can be performed at one or more layers of the cloud OSI model 500 for cloud computing environments. For example, translating the general policies into specific policies for different cloud computing environments can be performed at the service layer 504 and the software-defined data center layer 508. Various scripts can be updated across the service layer 504, the image layer 506, and the software-defined data center layer 508. Further, APIs and policies can operate at the software-defined data center layer 508 and the hypervisor layer 510.

Different cloud computing environments can have different service layers 504, image layers 506, software-defined data center layers 508, hypervisor layers 510, and infrastructure layers 512. Further, respective cloud computing environments can have the application layer 502 that can make calls to the specific policies in the service layer 504 and the software-defined data center layer 508. The application layer 502 can have noticeably the same format and operation for respective different cloud computing environments. Accordingly, developers for the application layer 502 do not ought to understand the peculiarities of how respective cloud computing environments operate in the other layers.

Figure 6:
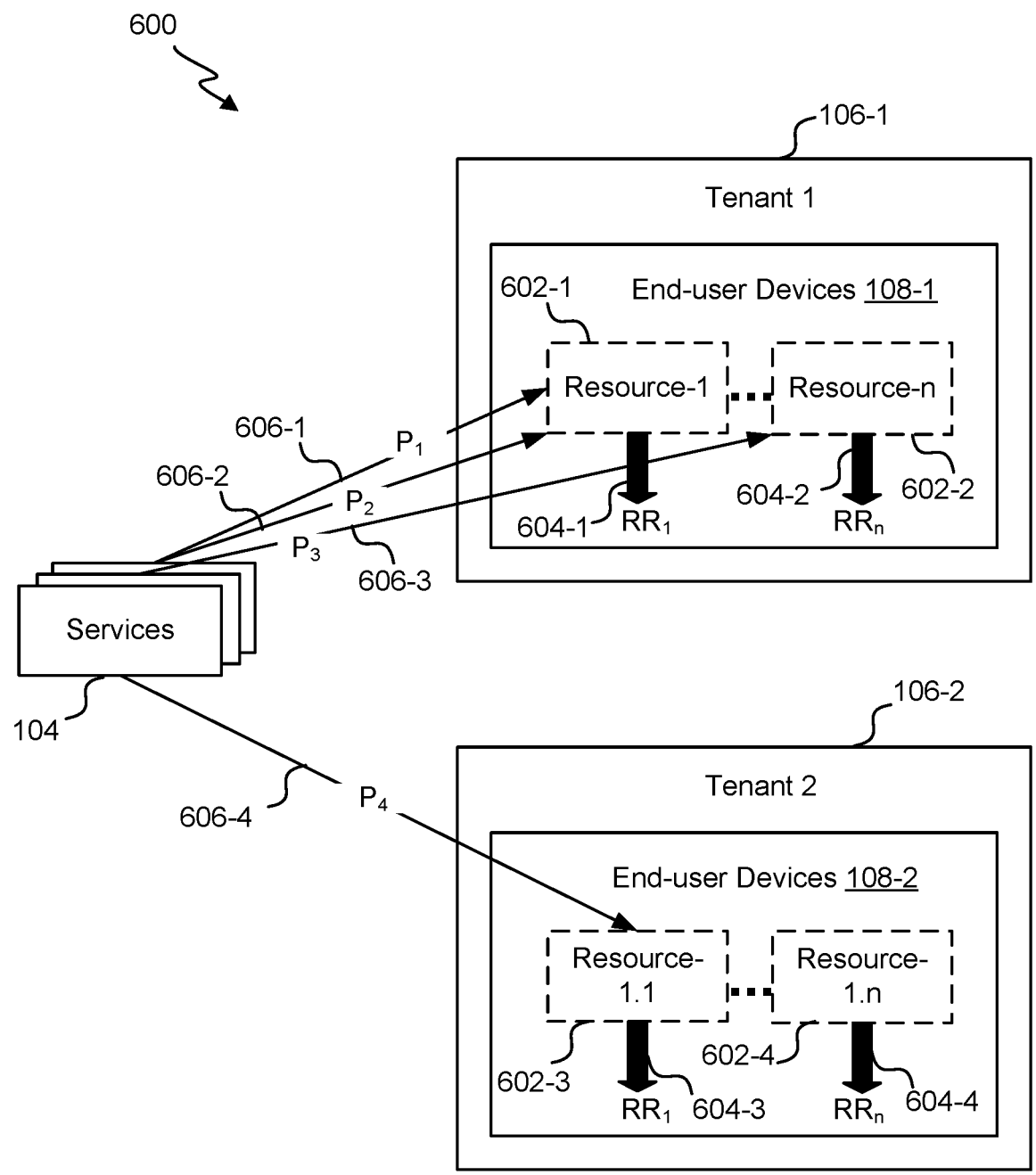
FIG. 6 illustrates an embodiment of resources of the end-user devices being accessed by the services.

Referring next to FIG. 6, an embodiment of the resources of the end-user devices 108 being accessed by the services 104 is shown. The FIG. 600 consists of the end-user devices 108 (108-1,108-2) within the tenant-1 106-1 and the tenant-2 106 2, respectively. The end-user devices 108-1 consists of multiple resources where a resource-1 602-1 has the resource metric $RR_1$ 604-1 and a resource-n 602-2 has the resource metric $RR_n$ 604-2. Similarly, the end-user devices 108-2 consists of multiple resources where a resource-1.1 602-3 has the resource metric $RR_1$ 604-3 and a resource-1.n 602-4 has the resource metric $RR_n$ 604-4. The services 104 access the resources 602 of the end-user devices 108 with policies $P_{1,2,3,4}$ 606 (606-1, 606-2, 606-3, 606-4). The service 104 can contain one or more policies 606 for the resource 602. The service 104 can also request the policies 606 across a multitude of resources.

The policies to access the resources 602 vary from tenant to tenant and from client to client. For example, a project manager in the enterprise 114 has the access to sharing documents outside the cloud from the resource-1 602-1 according to $P_1$ 606-1. However, a junior analyst at the enterprise 114 does not have the access to share files within or outside the cloud from the same resource, i.e., the resource-1 602-1, according to $P_2$ 606-2. In addition, the policy metric associated with $P_1$ will be higher than the policy metric associated with $P_2$. The file sharing across different clouds is riskier than sharing within the cloud. Therefore, if the project manager shares the file, it will supersede the policy of the junior analyst. The policy of the junior analyst $P_2$ will no longer be effective and will not contribute to the exposure metric of the service 104 in that dimension.

Figure 7:
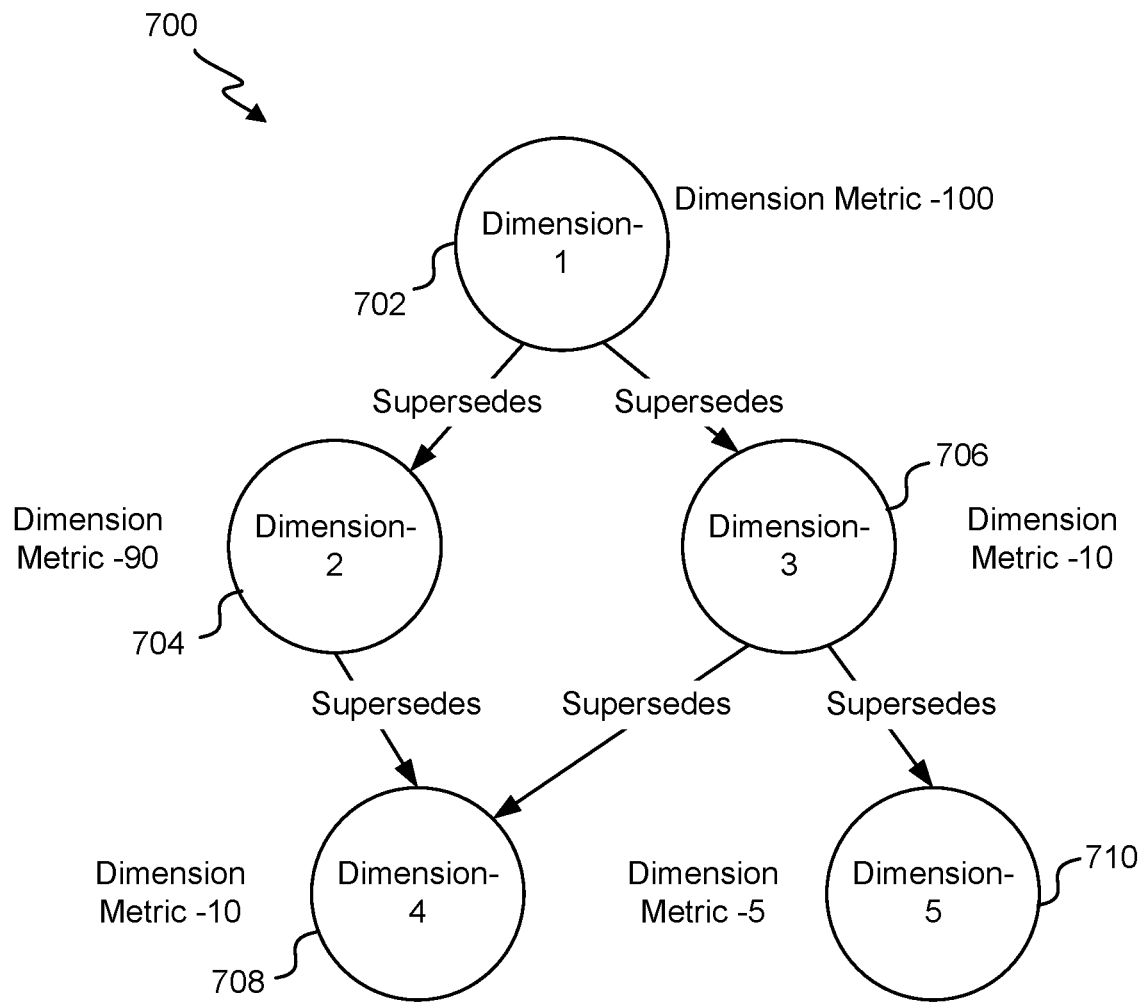
FIG. 7 illustrates an embodiment of an inter-dimensional hierarchy.

Referring next to FIG. 7, an embodiment of the inter-dimensional hierarchy 700 is shown. The dimensions can be aggregated inter-dimensionally and/or intra-dimensionally in the scoring server 110. Using the inter-dimensional hierarchy 700, the dimensions of the service 104 can be aggregated into higher order dimensions. For example, all policies that allow the service 104 to access data within the tenant 106 are aggregated under a single data-access dimension. Similarly, all network settings entailed by the service 104 can be aggregated under a network-utilization dimension. In the inter-dimensional hierarchy 700, there are five dimensions in total, each with its own d dimension metrics. A dimension-5 710 with the dimension metric of value 5, a dimension-4 708 with the dimension metric of value 10, a dimension-3 706 with the dimension metric of value 10. Further, there is a dimension-2 704 with the dimension metric of value 90 and a dimension-1 702 with the dimension metric equal to 100. The dimensions in the inter-dimensional hierarchy 700 are aggregated such that the dimension with the higher dimension metric supersedes the dimension with the lower dimension metric. As it is also shown, the dimension-3 706 supersedes the dimension-4 708 and dimension-5 710. The dimension-4 708 is also superseded by the dimension-2 704. The dimension-1 702, with the highest dimension metric, then supersedes the dimension-3 706 as well as the dimension-2 704.

The multi-dimensional risk scoring algorithm or the scoring method can be applied even at the aggregated dimensions. For example, consider the following service 104 where the metrics or scores for each of the data access policies and open authorization (OAuth) settings policies are known.

TABLE I

Policies of the Data Access Dimension

| Policy no. | Policies | Policy Metric |
|---|---|---|
| 1 | LDAP Directory Read All | 100 |
| 2 | User Profile Read | 20 |
| 3 | User Email ReadWrite | 60 |

The scoring method, when applied on the data access dimension of Table I, gives the dimension metric (D1) of 1.18. The policy metrics are first normalized, and the scoring method is applied as follows:

$$D1 = \sqrt{\left(\frac{100}{100}\right)^2 + \left(\frac{20}{100}\right)^2 + \left(\frac{60}{100}\right)^2} = 1.1832 \qquad \text{Eq. 4}$$

The multi-dimensional risk scoring algorithm or the scoring method, when applied on the OAuth Settings dimension of Table II, gives the dimension metric (D2) of 1.345. The policy metrics are first normalized, and the scoring method is applied as follows:

$$D2 = \sqrt{\left(\frac{100}{100}\right)^2 + \left(\frac{90}{100}\right)^2} = 1.345 \qquad \text{Eq. 5}$$

TABLE II

Policies of the OAuth Settings Dimension

| Policy no. | Policies | Policy Metric |
|---|---|---|
| 1 | Perennial Token | 100 |
| 2 | IP Restrictions Disabled | 90 |

These normalized dimension metrics are then used to create the hierarchy. In some other embodiments, different techniques of normalization can be used such as building a tree of metrics depicting a risk hierarchy.

The dimensions can also be aggregated by using the intra-dimensional hierarchy. The intra-dimensional hierarchy refers to the hierarchy within a single dimension. In the single dimension, hierarchy is created by the policy metrics associated with different policies in that dimension. The policies with higher policy metric supersede the policies with lower policy metric. Hence, the policies with the lower policy metric are no longer effective and their risk impact can be neglected. For example, an O365 policy "Directory.Readwrite.All" allows writing to LDAP directory for all end-user devices 108 in the tenant 106. Hence, the policy "Directory.Readwrite.All" supersedes the following policies:

1) Directory.Read.All
2) Directory.Write.All
3) Directory.Read
4) Directory.Write Hence, if the service 104 has the following policies:

1) Directory.ReadWrite.All
2) Directory.Read.All
3) Directory.Write
4) UserEmail.Write Then, the effective policies that are to be considered for the service 104 are:

1) Directory.ReadWrite.All
2) UserEmail.Write

Once the effective policies are identified, the exposure metric for specific dimensions of the service 104 can be calculated using the scoring method of the present disclosure.

Another case for the intra-dimensional hierarchy is when the dimension consists of several sub-dimensions. For example, consider the Data Access dimension. The dimension can have multiple sub-dimensions each representing the data access of various types such as Profile Data Access, File Data Access etc. In such cases, the dimension metric of each sub-dimension is calculated, and the hierarchy is created based on the dimension metrics of the sub-dimensions.

In another embodiment of aggregation using the intra-dimensional hierarchy, the policies within the dimension can be shown as a set. The set of policies is then represented as a graph with an edge between the policy and the policy it supersedes. The dimension graph is topologically sorted, and the dimension metric or risk score associated with the first dimension in the sorted set is considered to be the risk for that dimension.

Figure 8:
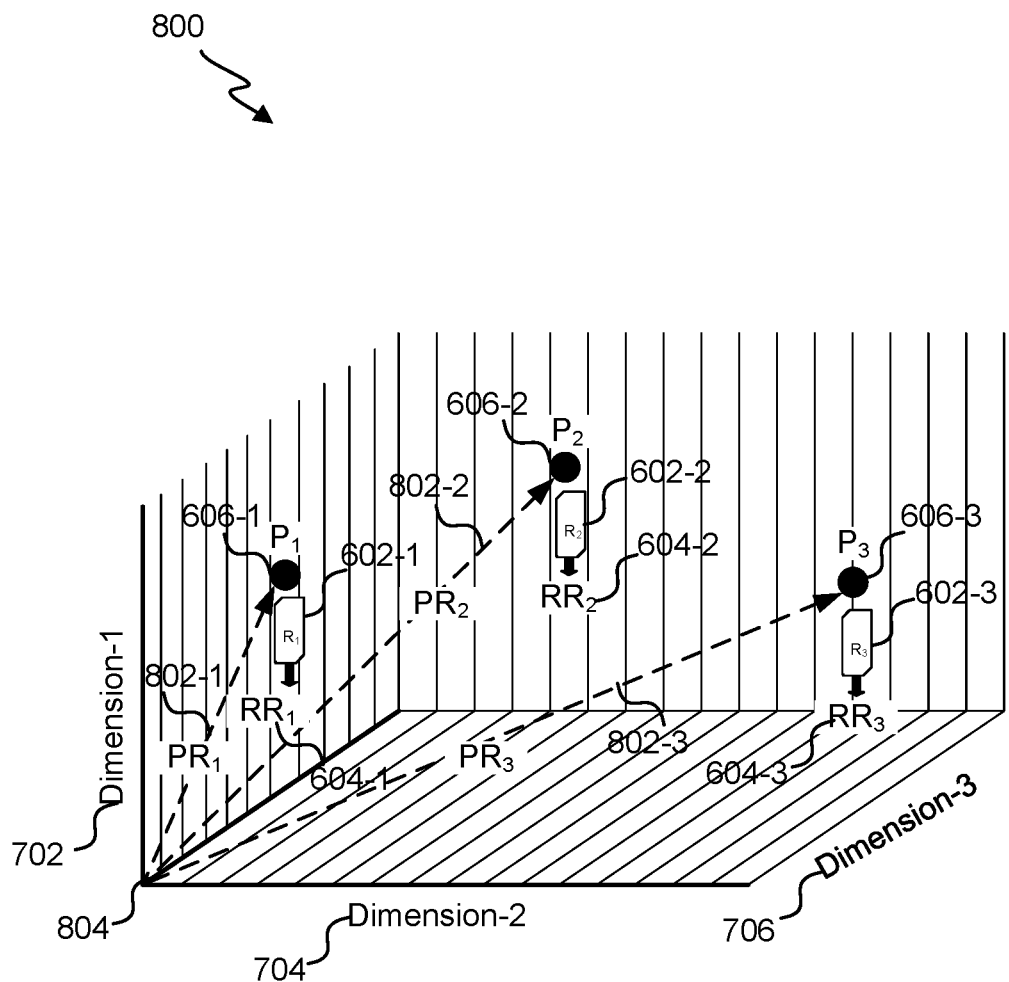
FIG. 8 illustrates a relationship between different metrics in a multi-dimensional vector space.

Referring next to FIG. 8, a relationship between different metrics in the multi-dimensional vector space 800 is shown. The multi-dimensional vector space 800 is made of three dimensions; Dimension-1 702, Dimension-2 704, and Dimension-3 706. There can be N dimensions of the service 104 in the multi-dimensional vector space 800 that are not shown here. The policies $P_1$ 606-1, $P_2$ 606-2, and $P_3$ 606-3 are points in the multi-dimensional vector space 800. The distance of the policies 606 (606-1, 606-2, 606-3) from the origin 804 is the policy metric in that dimension. The policy metric of $P_1$ 606-1 is $PR_1$ 802-1, the policy metric of $P_2$ 606-2 is $PR_2$ 802-2, and the policy metric of $P_3$ 606-3 is $PR_3$ 802-3.

The policies $P_1$, P2, and $P_3$ are used to access the resources $R_1$ 602-1, $R_2$ 602-2, and $R_3$ 602-3. The weight of the resource $R_1$ 602-1 with respect to other resources in the multi-dimensional vector space 800 determines the resource metric in that dimension. The resource metric or the risk score associated with the three resources in a particular dimension is shown at $RR_1$ 604-1, $RR_2$ 604-2, and $RR_3$ 604-3. The exposure metric of the service 104 is calculated from the combined effect of the dimension metrics, the policy metrics, and the resource metrics in the multi-dimensional vector space 800.

In one embodiment, the policy metrics, the resource metrics, and the dimension metrics from the scoring technique can be used to find a heat point. The heat point in the multi-dimensional vector space 800 indicates the dimension or an aspect of the service 104 that ought attention.

Figure 9:
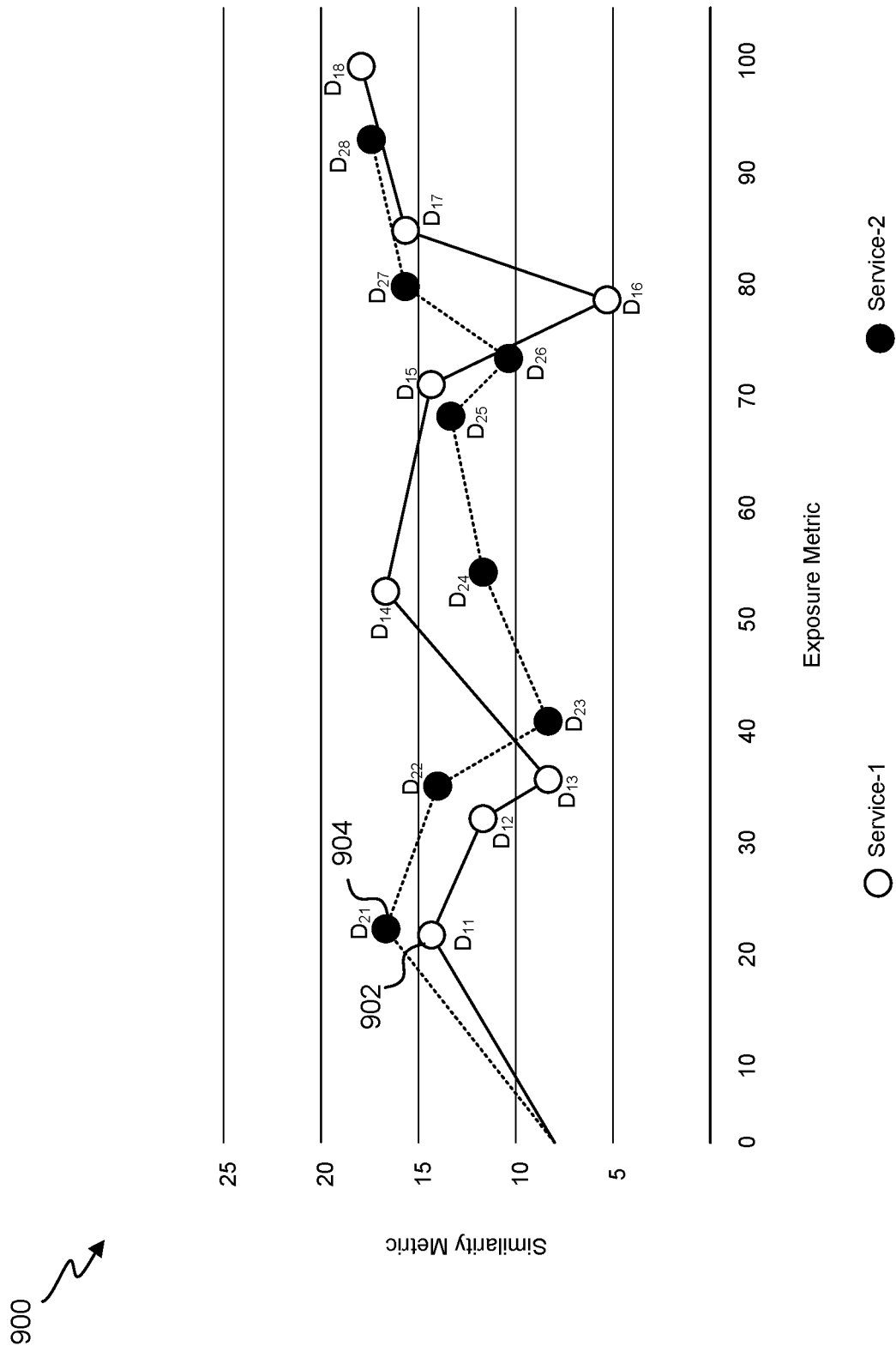
FIG. 9 illustrates a graph representing similarities between the dimensions of two or more services.

Referring next to FIG. 9, a graph 900 representing the similarities between dimensions of the services 104 is shown. In one embodiment, the multi-dimensional and hierarchical scoring technique for the services 104 is used to find similarities between two or more services. The graph 900 shows the dimensions of the two services, i.e., service-1 and service-2. On the horizontal scale are the exposure metrics in each of the dimensions of the two services. The vertical scale shows the similarity metric between both services in each of their dimensions. Point $D_{11}$ 902 on the graph 900 shows the first dimension of service-1. Similarly, another point $D_{21}$ 904 on the graph shows the first dimension of service-2. Other dimensions of both services can also be seen on graph 900.

The similarity metric is calculated by doing a slight modification to the scoring technique explained above. To calculate the similarity metric, a Euclidean distance is calculated between the exposure metrics of the two or more services. Let's suppose the exposure metric of the service −1 is $E_1$ and the exposure metric of the service −2 is $E_2$. The formula for calculating the similarity metric is given below:

$$\text{Similarity Metric} = \sqrt{\sum_{i=1}^{n} (E_1 - E_2)^2} \qquad \text{Eq. 6}$$

For example, consider the service-1 and the service-2 of the graph 900 to be Zoom™ and Microsoft Teams™ respectively. To find the similarity between individual dimensions of Zoom™ and Microsoft Teams™, the exposure metrics of the two in those dimensions are calculated. Let's suppose that the exposure metric of Zoom™ is 68 and the exposure metric of Microsoft Teams™ is 52. The similarity metric of two can be calculated as:

$$\text{Similarity Metric} = \sqrt{\sum_{i=1}^{2} (68 - 52)^2} = 16 \qquad \text{Eq. 7}$$

The similarity metric tells relativity between two or more services. It further tells how two or more services are similar in terms of their risk impact. The service 104 may be similar to other services in some dimensions but different in other dimensions. The Euclidean distance between the exposure metrics of the services 104 defines the similarity between the services 104 in terms of their hazardous impact. The smaller the Euclidean distance or the similarity metric value, the more similar the service-1 and service-2 are in terms of their hazardous impact. The services 104 are said to have similar hazardous impact or risk if the value of their similarity metric is lesser a threshold. The threshold varies from service-to service and is based on what dimensions, policies and resources are being used by the service 104.

If the similarity metric is below a threshold, the classifier 312 declares the two or more services as similar in terms of their hazardous/risk impact. An alert may be generated to notify the end-user devices 108 about the risk impact of the services 104. The status of the services 104 is shown on the GUI 314. An alerting module can be employed at the scoring server 110 to notify the client 210 in one embodiment.

In another embodiment, the recommendation engine 310 uses the similarity metric to suggest one service over the other to the client 210 at the end-user devices 108. The option to get a recommendation is also available to the client 210 at the GUI 314.

Figure 10:
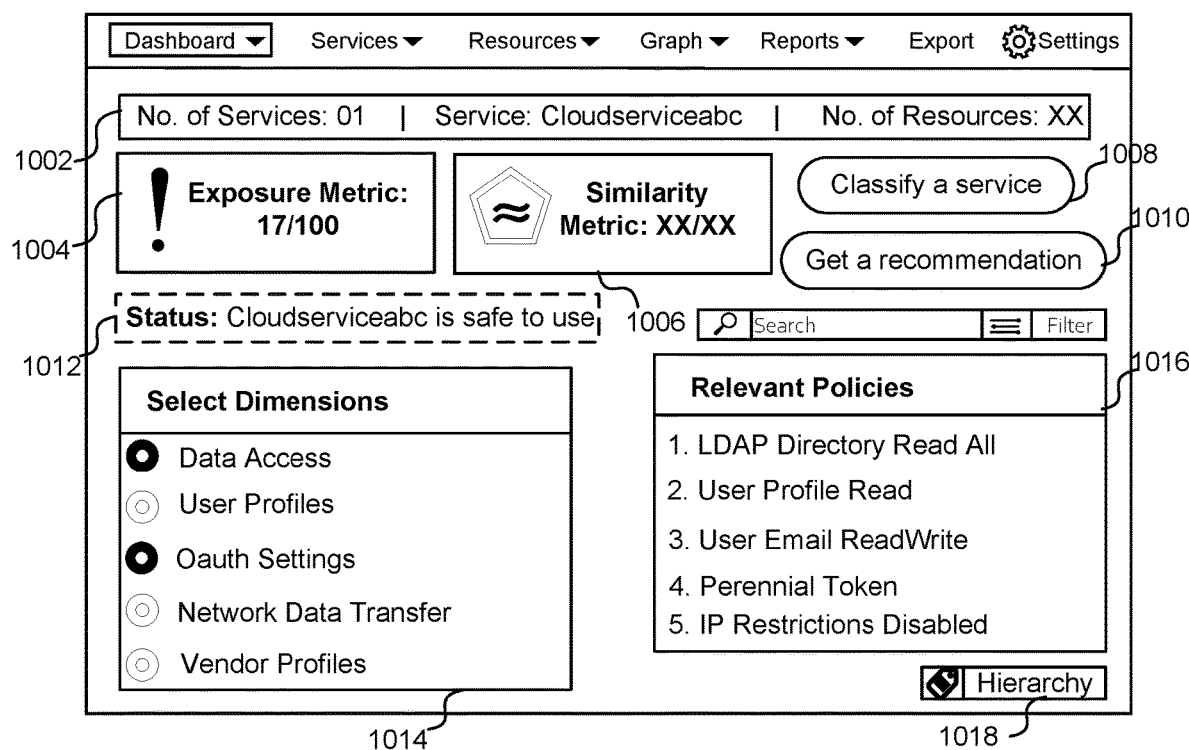
FIG. 10 illustrates a Graphical User Interface (GUI) of the scoring server displayed to the client and/or administrator of an enterprise.

Referring next to FIG. 10, the GUI 314 of the scoring server 110 is displayed to the client 210 and/or the administrator of the enterprise 114 is shown. The GUI 314 has section 1002 where a number of services, the name of the service, and the number of resources of the service 104 can be seen. The scoring server 110 can evaluate more than one service at a time. For example, the name of the service 104 being evaluated in the GUI 314 is "CloudServiceabc". This is an exemplary service, and the exposure metric of the CloudServiceabc is 17, as displayed in section 1004. If there is more than one service selected, the GUI 314 outputs their similarity metric in section 1006. The client 210 or the administrator of the enterprise 114 can also classify a new service in section 1008. The client 210 or the administrator of the enterprise 114 can get a recommendation from the scoring server 110 in section 1010 at the GUI 314. At section 1012, the status of the CloudServiceabc is shown. Since the exposure metric of CloudServiceabc is lesser than the threshold, the CloudServiceabc is safe to use as per status in section 1012.

The clients 210 can select dimensions at section 1014 from a list of dimensions of CloudServiceabc. Other features of the GUI 314 include displaying the list of relevant policies and hierarchy in section 1016 and 1018, respectively. The relevant policies include policies of the selected dimensions. The hierarchy in section 1018 can show a topographic mapping, a tree, or a graph of the inter-dimensional and/or the intra-dimensional hierarchy. Notice that the GUI 314 is only an exemplary illustration of what a GUI might look like. The GUI 314 can include other dimensions, policies, graphs etc. that are not shown in the GUI 314.

Figure 11:
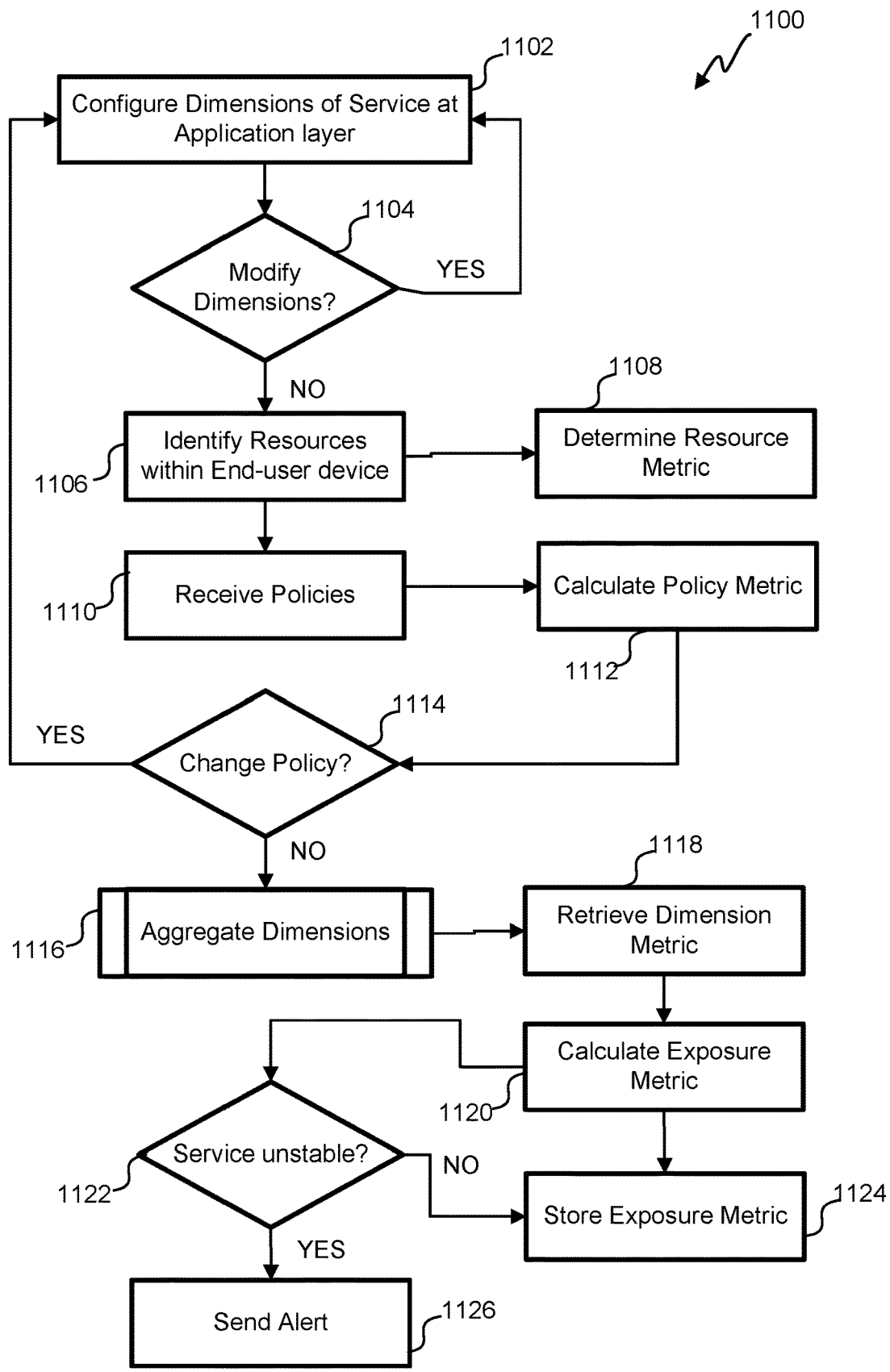
FIG. 11 illustrates a flowchart of a scoring process of the service in an application layer of the OSI model.

Referring next to FIG. 11, a flowchart of a scoring process 1100 of the service 104 at the application layer 502 of the cloud OSI model 500 is shown. At block 1102, the scoring server 110 configures the dimensions of the service 104 at the application layer 502. The configuring of the dimensions is done either by the client 210 and/or by the vendor of the service 104. The dimensions can also be selected by the administrator of the enterprise 114. The configuration of the dimensions is done at the display 216 of the end-user devices 108. The configuration of the dimension includes pinning the dimension and/or introducing a new dimension, excluding the dimension, and modifying the weights of the dimensions of the service 104.

At block 1104, the scoring server 110 checks whether the dimensions have been modified or not. If the answer is yes, then dimensions are configured again so that no dimension of the service 104 is left behind. However, if the dimensions have not been modified, the scoring process 1100 is continued. At block 1106, the scoring server 110 identifies the resources 602 within the end-user devices 108. The scoring server 110 makes a list of resources and retrieves their weights relative to each other in the multi-dimensional vector space 800. From the weights of each of the resources 602, the scoring server 110 determines the resource metric 604 of the resources 602 at block 1108.

At block 1110, the scoring server 110 receives the policies 606 from the policy cache 208 of the end-user devices 108. The policies 606 related to the resources 602 in the particular dimension only are retrieved. At block 1112, the scoring server 110 calculates the policy metric 802 associated with the policies 606. The policy metric 802 is calculated by measuring the distance of the point that indicates the policy 606 in the multi-dimensional vector space 800.

At block 1114, the scoring server 110 checks if the policies 606 of accessing the resources 602 in the selected dimensions have been changed by the administrator or not? If the policies 606 have been changed, then the scoring process 1100 is started all over again. Otherwise, the assembler 308 of the scoring server 110 goes on to aggregate the dimensions of the service 104 at block 1116.

The dimensions of the service 104 can be aggregated according to the inter-dimensional and/or the intra-dimensional hierarchy. The dimensions are aggregated such that the dimensions with lower dimension metric are superseded by the dimensions with higher dimension metric. After the hierarchy is built and the dimensions are aggregated according to that hierarchy, the scoring server 110 retrieves the dimension metric at block 1118. The dimension metric signifies the risk associated with the service 104 in that particular dimension.

At block 1120, the RM engine 304 of the scoring server 110 calculates the exposure metric of the service 104. The exposure metric calculated is based on the policy metric 802, the resource metric 604, and the dimension metric. The exposure metric indicates a risk magnitude considering a set of weighted dimension metrics across each dimension that the risk manifests in. The exposure metric of the service 104 is always positive and ranges between 0 to 100.

At block 1122, the scoring server 110 determines if the service 104 is stable, or say, safe to use or not. This description about the service 104 is referred as the status of the service 104 in this application. The status of the service is determined by comparing the exposure metric of the service 104 with the threshold. The threshold for the service 104 is changed once the dimensions, the policies, or the resources are changed or modified. If the service 104 is concluded to be stable, the scoring server 110 stores its exposure metric in the meta database 306. The exposure metrics of the services 104 are always stored, no matter the status of the service 104.

If the service 104 is determined to be unstable, the scoring server 110 sends alerts to the end-user devices 108 at block 1126. The alerts can be shown at the GUI 314 of the scoring server 110 or an alerting module can also be employed at the scoring server 110 in an embodiment.

Figure 12:
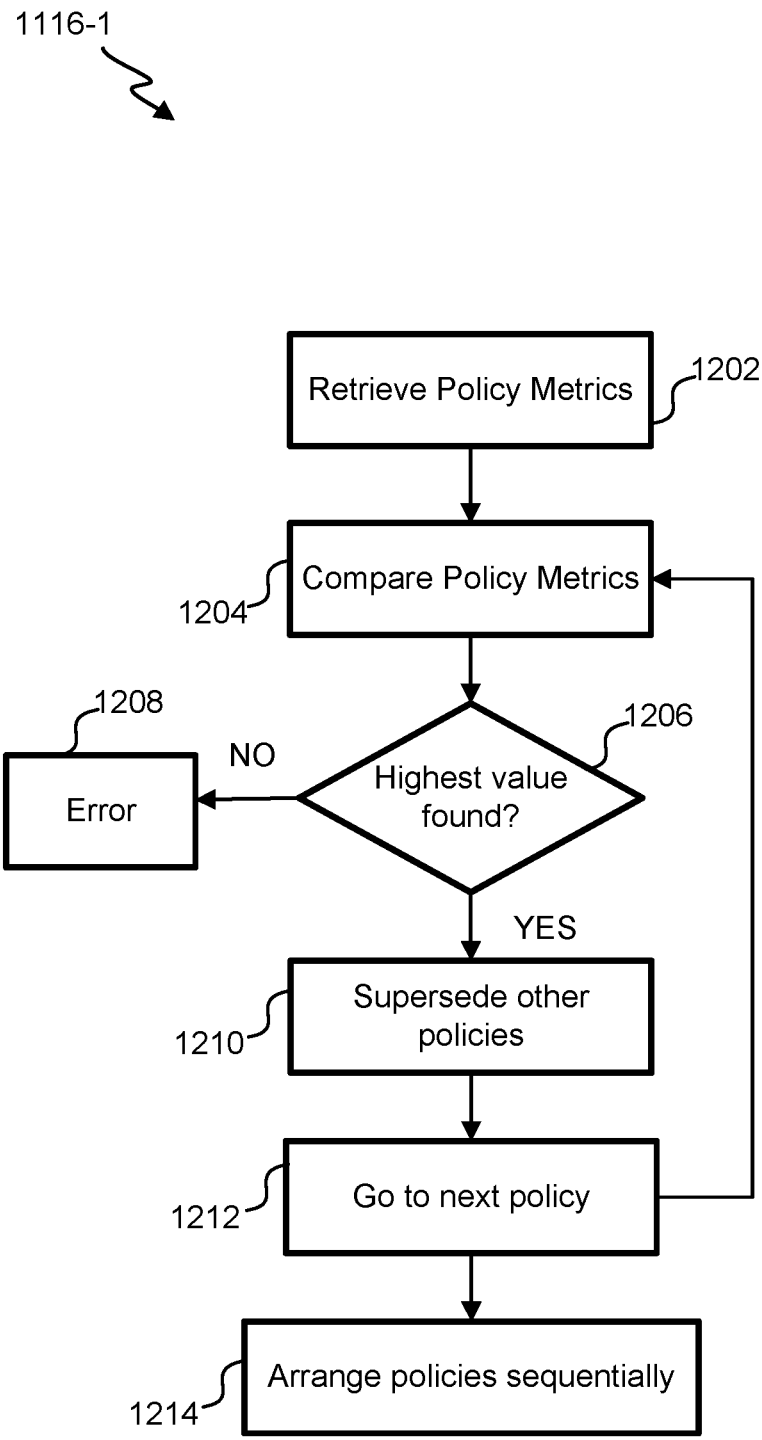
FIG. 12 illustrates a flowchart of aggregating dimensions using an intra-dimensional hierarchy.

Referring next to FIG. 12, a flowchart aggregating 1116-1 the dimensions using the intra-dimensional hierarchy is shown. At block 1202, the assembler 308 of the scoring server 110 retrieves the policy metrics 802 of the related policies within the dimension. At block 1204, the policy metrics 802 are compared with each other. In one embodiment, a maximizing function can be used to find the largest value out of the policy metrics 802.

At block 1206, the assembler 308 checks whether the highest value of the policy metrics 802 is found or not? If the assembler 308 is somehow unable to output the highest value, the scoring server 110 will show an error at block 1208. If the policy metric 802 of the highest value is found, the associated policy will supersede other policies in that dimension at block 1210. Superseding policies 606 means that the policy 606 with a higher policy metric is more effective than the policies 606 with a lower policy metric. Thus, the effect of superseded policies can be neglected in the intra-dimensional hierarchy.

At block 1212, the assembler 308 goes to the next policy of the dimension. The process is repeated for all the policies 606 of the dimension. At the end all the policies 606 are arranged sequentially at block 1214, thus creating the intra-dimensional hierarchy for the scoring process 1100.

Figure 13:
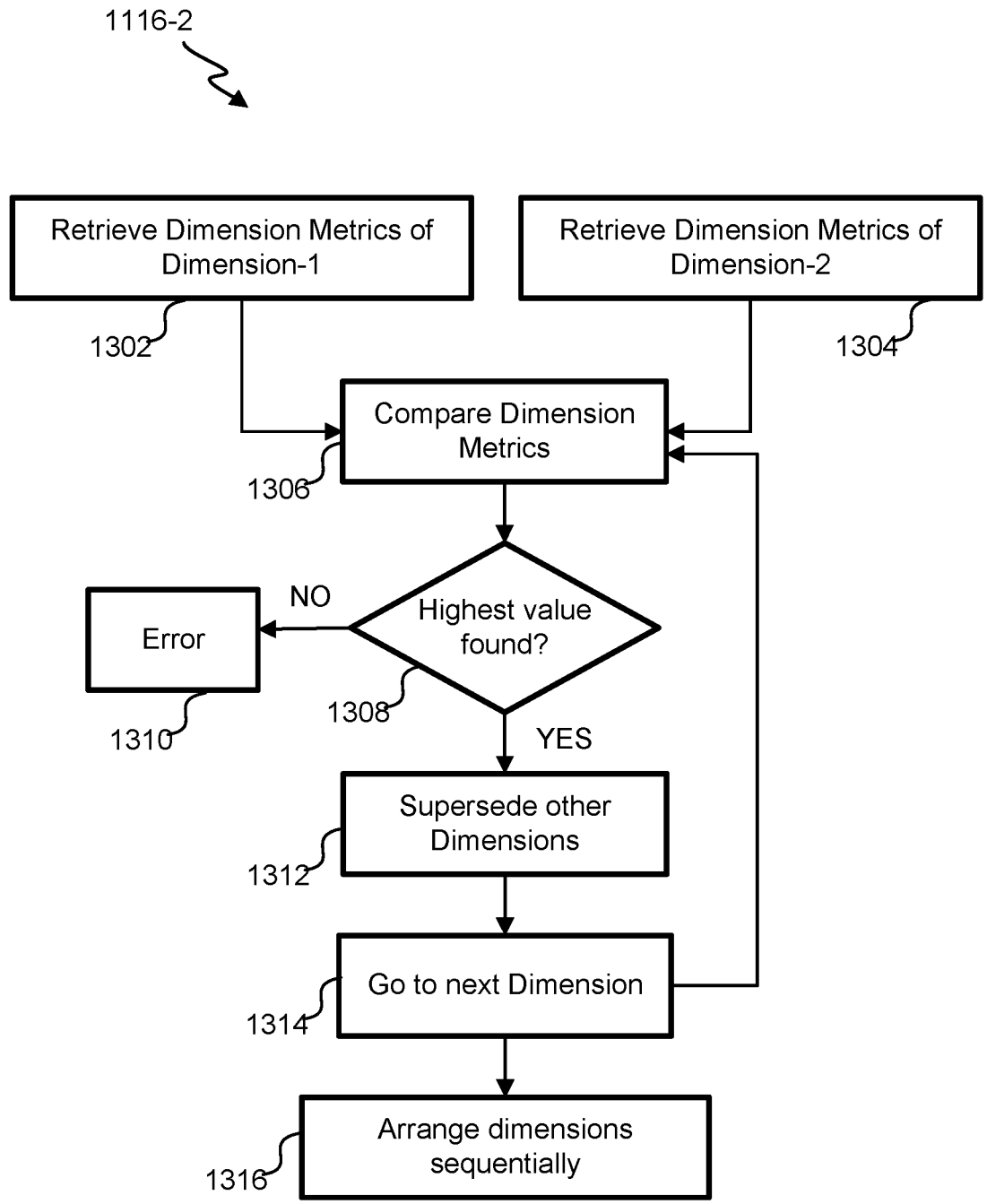
FIG. 13 illustrates a flowchart of aggregating dimensions using the inter-dimensional hierarchy.

Referring next to FIG. 13, a flowchart of aggregating 1116-2 the dimensions using the inter-dimensional hierarchy 700 is shown. The inter-dimensional hierarchy 700 refers to the hierarchy created within multiple dimensions of the service 104. At block 1302, the scoring server 110 retrieves the dimension metric of the dimension-1 702. At block 1304, the scoring server retrieves the dimension metric of the dimension-2 704. Each dimension of the service 104 has the policies 606 for accessing the resources 602. There can be any number of dimensions, only two are shown here for understanding purposes.

At block 1306, the dimension metrics are compared with each other. In one embodiment, a maximizing function can be used to find the largest value out of the dimension metrics of the service 104. In other cases, different statistical aggregation functions can be used instead of maximizing function i.e. average function, taking mode, median, clamp etc. At block 1308, the assembler 308 checks whether the highest value of the dimension metrics is found or not? If the assembler 308 is somehow unable to output the highest value, the scoring server 110 will show the error at block 1310.

If the dimension metric of the highest value is found, the associated dimension will supersede other dimensions of the service 104 at block 1312. Superseding of the dimensions means that the dimension with higher dimension metric is effective than the dimensions with a lower dimension metric. Thus, the effect of superseded dimensions can be neglected in the inter-dimensional hierarchy.

At block 1314, the assembler 308 goes to the next dimension of the service 104. The process is repeated for all of the dimensions of the service 104. At the end, all the dimensions are arranged sequentially at block 1316, thus creating the inter-dimensional hierarchy 700 for the scoring process 1100.

Figure 14:
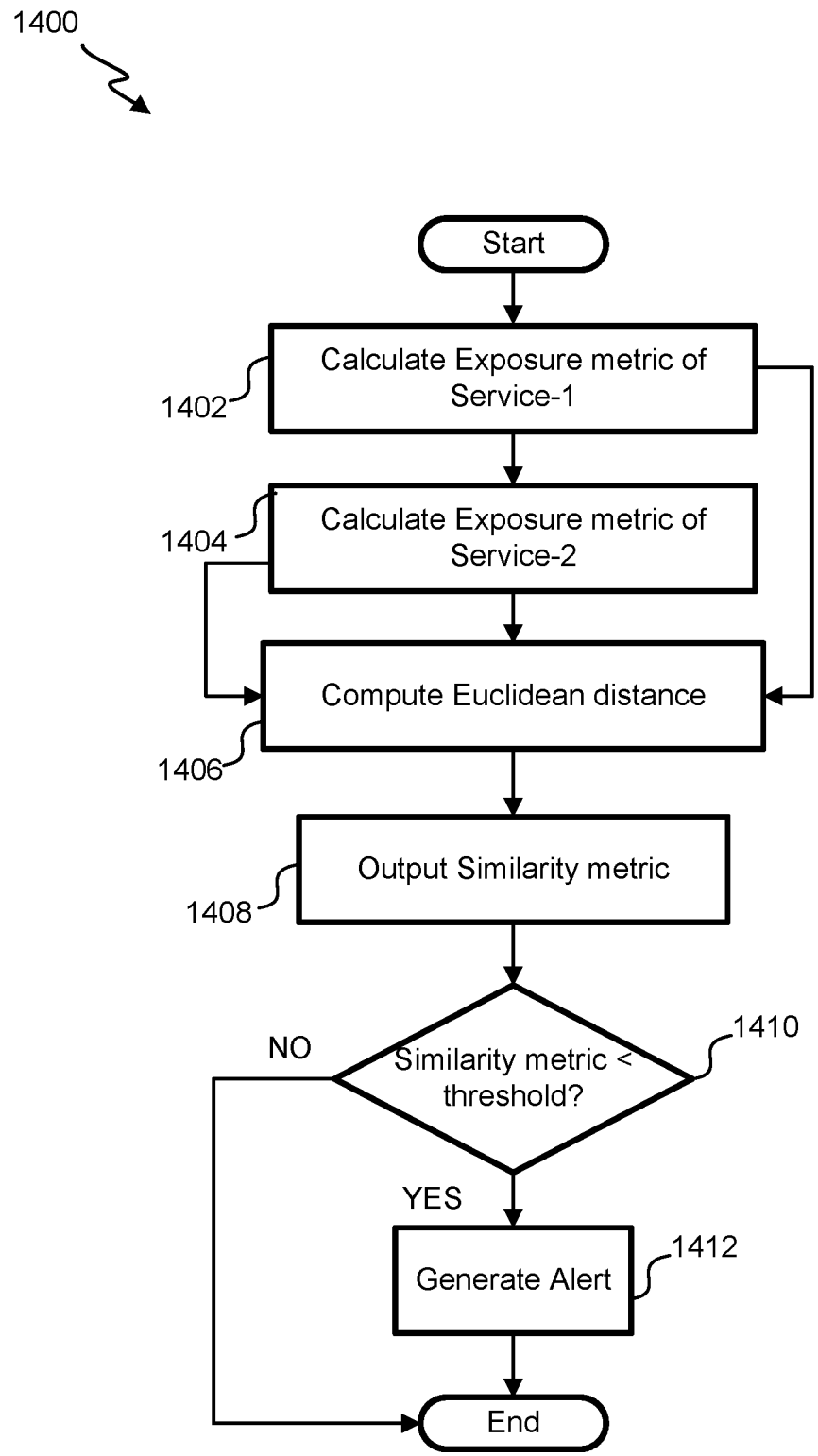
FIG. 14 illustrates a flowchart of determining the similarity between two or more services.

Referring next to FIG. 14, a flowchart for determining similarity 1400 between two or more services is shown. The scoring server 110 determines if two or more services are similar or not, using the multi-dimensional scoring method. First, the exposure metrics of the services 104 are calculated by following the scoring process 1100. Then, the Euclidean distance between the exposure metrics is calculated to create the similarity metric. The similarity metric tells how much two or more services are similar regarding their risk impact.

At block 1402, the RM engine 304 of the scoring server 110 calculates the exposure metric of a service-1. At block 1404, the RM engine 304 of the scoring server 110 calculates the exposure metric of a service-2. The method of calculating the exposure metric is described in the scoring process 1100. There can be any number of services, only two are shown here for understanding purposes.

At block 1406, the Euclidean distance is computed between the exposure metrics of the service-1 and the service-2. The output from the Euclidean distance is called the similarity metric. The similarity metric tells how the service-1 and the service-2 are similar to each other regarding their stability or instability/risk impact in the selected dimensions.

At block 1408, the scoring server 110 outputs the similarity metric at the GUI 314. The similarity metric at the GUI 314 can be seen at section 1006. At block 1410, the scoring server 110 checks whether the similarity metric is lesser than a threshold or not? The threshold varies across the services 104 depending upon what dimensions, policies and/or resources are being accessed.

If the similarity metric is lesser than the threshold, this means that the service-1 and the service-2 are similar to one another. This poses a security risk for the two services. Hence, the scoring server 110 generates the alert for the end-user devices 108 at block 1412. The alerts can be shown at the GUI 314 of the scoring server 110 or an alerting module can also be employed at the scoring server 110 in an embodiment. If the similarity metric is greater than the threshold, this means that the service-1 and the service-2 are not similar to each other. Hence, there is no security risk for the two services. As a result, the process for determining similarity 1400 is ended at the scoring server 110.

Figure 15:
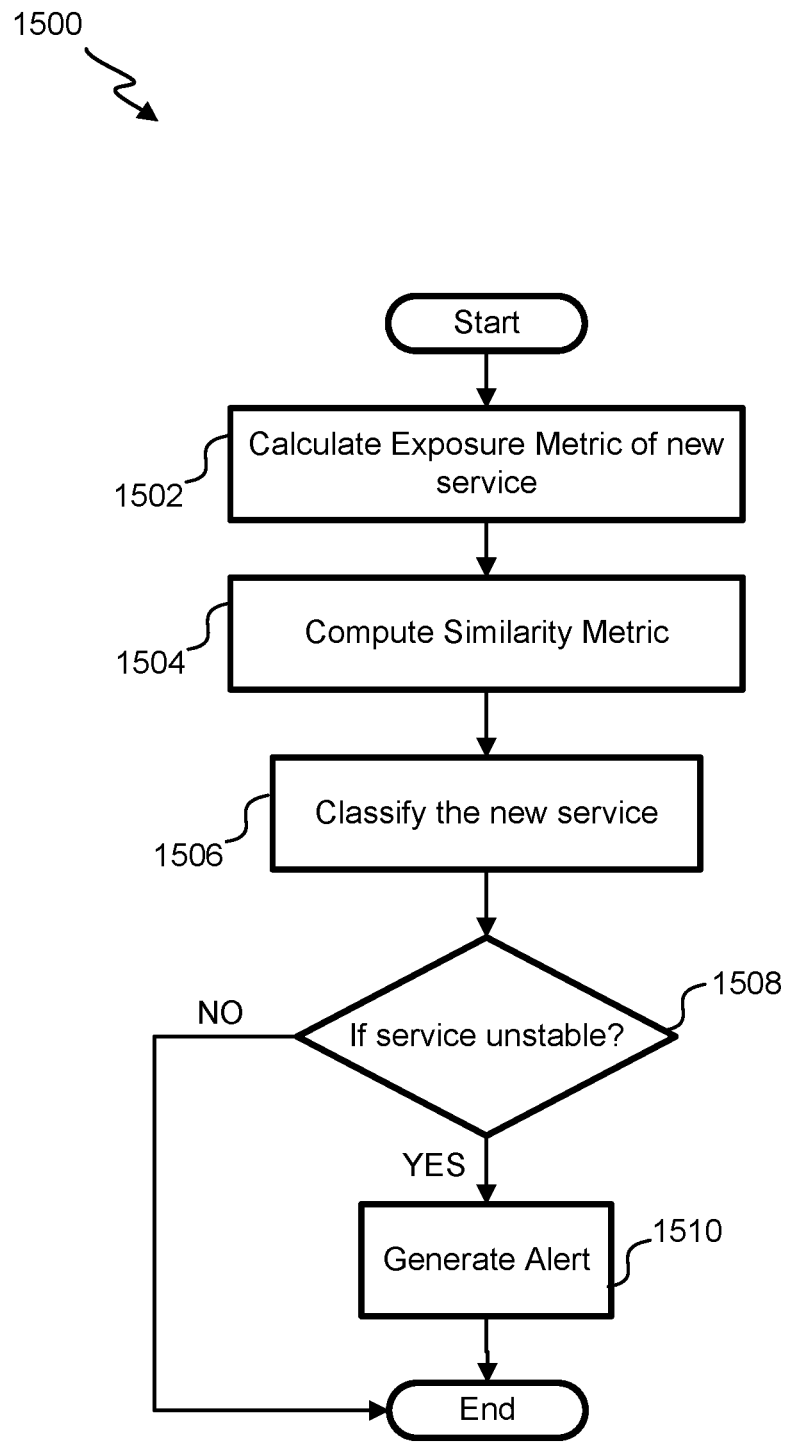
FIG. 15 illustrates a flowchart of classifying a new service based on the knowledge of previously known services.

Referring next to FIG. 15, a flowchart for classifying 1500 a new service based on the knowledge of previously known services is shown. The scoring server 110 of the scoring system 100 includes the meta database 306. The meta database 306 provides storage for the resources 602, the dimensions, the policy metrics 802, the resource metric 604, the dimension metrics, and the exposure metrics of the services 104. The classifier 312 of the scoring server 110 uses vectorized classification techniques to rank the new service based on the knowledge of previously evaluated services. In one embodiment, the classifier 312 can use machine learning algorithms to evaluate the new service.

At block 1502, the RM engine 304 of the scoring server 110 calculates the exposure metric of the new service. The method of calculating the exposure metric is described in the scoring process 1100. The classifier 312 retrieves information of the services 104 from the meta database 306 with similar dimensions, policies, and resources. The scoring server 110 then computes the similarity metric of the new service with such services at block 1504.

The similarity metric is computed between the exposure metrics of the two or more services. At block 1506, the new service gets classified as unstable/risky or stable/non-risky. The new service is said to be similar to the service 104 if the similarity metric of the two services is lesser than the threshold. If the new service is found to be posing risk similar to the service 104, the classifier 312 tags the new service as an unstable or risky service.

At block 1508, the scoring server 110 determines whether the classifier 312 has stated the new service as stable or unstable. If the new service is classified as unstable, this poses a security risk for the new service. Hence, the scoring server 110 generates the alert for the end-user devices 108 at block 1510. The alerts can be shown at the GUI 314 of the scoring server 110 or an alerting module can also be employed at the scoring server 110 in an embodiment.

If the new service is classified as stable, this means there is no security risk for the new service. As a result, the process for classifying 1500 the new service ended at the scoring server 110. In another embodiment, the scoring server 110 can also consider recommendations from outside the tenants 106 at the application layer 502. The scoring server 110 can collect reviews from outside the tenancy, thus inheriting the information about the service 104. If a large number of users say that the service 104 is unstable in particular domains, then the classifier 312 tags that service also as unstable.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process that is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine readable mediums for storing information. The term "machine-readable medium" includes but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as a limitation on the scope of the disclosure.

I claim:

1. A scoring system for assigning an exposure metric to a service of a plurality of services accessed by a plurality of end-user devices in an application layer of a cloud-based system, the scoring system comprises:
   a tenant of a plurality of tenants using the plurality of services, the tenant includes the plurality of end-user devices; and
   a scoring server operable to:
      configure a plurality of dimensions for the service of the plurality of services, wherein:
         the plurality of dimensions are functions of the service of the plurality of services running on the application layer, and
         the plurality of dimensions is configured by a client and/or a vendor of the service of the plurality of services;
      identify a plurality of resources present in an end-user device or cloud subscriptions owned by the plurality of end-user devices of the tenant, wherein the plurality of resources within the end-user device are components, functionality and/or data that is accessed by the plurality of services;
      determine a resource metric that is a weight of a resource in a dimension;
      receive a plurality of policies associated with the end-user device of the plurality of end-user devices, wherein a policy of the plurality of policies is a point in a vector space;
      calculate a policy metric that is a distance of the point from an origin of the vector space;
      aggregate the policy of the plurality of policies and/or the dimension of the plurality of dimensions based on the policy metric associated with the dimension;
      retrieve a dimension metric associated with the dimension of the plurality of dimensions, wherein:
         the dimension metric signifies a vector in the vector space, and
         the vector space comprises a plurality of vectors that indicates the plurality of dimensions of the service;
      compute the exposure metric for the service of the plurality of services running on the application layer, wherein:

the exposure metric of the service defines a status of the service, and the policy metric, resource metric, and the dimension metric of the plurality of services are used to calculate the exposure metric;

store the exposure metric of the service of the plurality of services;

determine the status of the service based on the exposure metric; and send an alert to inform the plurality of end-user devices about the status of the service of the plurality of services.

2. The scoring system of claim 1, wherein the configuration of the plurality of dimensions includes:

pinning the dimension and/or introducing a new dimension in the plurality of dimensions, excluding the dimension from the plurality of dimensions, and modifying the weights of the dimension of the plurality of dimensions.

3. The scoring system of claim 1, wherein the exposure metric is calculated again upon changes in the configuration of the plurality of dimensions and/or the plurality of policies.

4. The scoring system of claim 1, wherein the exposure metric is between 1 and 100.

5. The scoring system of claim 1, wherein the exposure metric is accessible to the client to determine which service of the plurality of services is safe and which one is not safe.

6. The scoring system of claim 1, wherein the exposure metric of the service is always positive.

7. The scoring system of claim 1, wherein the aggregating of the dimensions of the plurality of dimensions instructs the policy of the plurality of policies with higher policy metric to supersede the policy with lower policy metric in a hierarchy.

8. The scoring system of claim 1, wherein the aggregating of the dimensions of the plurality of dimensions instructs the dimension of the plurality of dimensions with higher dimension metric to supersede the dimension with lower dimension metric in a hierarchy.

9. The scoring system of claim 1, wherein the status of the plurality of services refers to stability or instability of the plurality of services.

10. The scoring system of claim 1, wherein the plurality of services uses the plurality of policies to access the plurality of resources within the plurality of end-user devices in the tenant.

11. The scoring system of claim 1, wherein the aggregation can be intra-dimensional or inter-dimensional.

12. The scoring system of claim 1, wherein a similarity between the plurality of services is determined by calculating a Euclidean distance between the exposure metrics of the plurality of services.

13. The scoring system of claim 1, wherein a Euclidean distance between the exposure metrics of the plurality of services defines the similarity between the plurality of services in terms of their hazardous impact.

14. The scoring system of claim 1, wherein a machine learning algorithm is employed to automatically assign the exposure metric to a new service similar in functionality to the plurality of previously evaluated services.

15. A scoring method for assigning an exposure metric to a service of a plurality of services accessed by a plurality of end-user devices belonging to a tenant of a plurality of tenants in an application layer of a cloud-based system, the scoring method comprising:

configuring a plurality of dimensions for the service of the plurality of services, wherein:

the plurality of dimensions are functions of the service of the plurality of services running on the application layer, and the plurality of dimensions is configured by a client and/or a vendor of the service of the plurality of services;

identifying a plurality of resources present in an end-user device or cloud subscriptions owned by the plurality of end-user devices of the tenant, wherein the plurality of resources within the end-user device are components, functionality and/or data that is accessed by the plurality of services;

determining a resource metric that is a weight of a resource in a dimension;

receiving a plurality of policies associated with the end-user device of the plurality of end-user devices, wherein a policy of the plurality of policies is a point in a vector space;

calculating a policy metric that is a distance of the point from an origin of the vector space;

aggregating the policy of the plurality of policies and/or the dimension of the plurality of dimensions based on the policy metric associated with the dimension;

retrieving a dimension metric associated with the dimension of the plurality of dimensions, wherein:

the dimension metric signifies a vector in the vector space, and the vector space comprises a plurality of vectors that indicates the plurality of dimensions of the service;

computing the exposure metric for the service of the plurality of services running on the application layer, wherein:

the exposure metric of the service defines a status of the service, and the policy metric, resource metric, and the dimension metric of the plurality of services are used to calculate the exposure metric;

storing the exposure metric of the service of the plurality of services;

determining the status of the service based on the exposure metric; and sending an alert to inform the plurality of end-user devices about the status of the service of the plurality of services.

16. The scoring method of claim 15, wherein the aggregating of the dimensions of the plurality of dimensions instructs the policy of the plurality of policies with higher policy metrics to supersede the policy with lower policy metrics in a hierarchy.

17. The scoring method of claim 15, wherein the aggregating of the dimensions of the plurality of dimensions instructs the dimension of the plurality of dimensions with higher dimension metric to supersede the dimension with lower dimension metric in a hierarchy.

18. A non-transitory computer-readable media having computer-executable instructions embodied thereon that when executed by one or more processors, facilitate a scoring method for assigning an exposure metric to a service of a plurality of services accessed by a plurality of end-user devices belonging to a tenant of a plurality of tenants in an application layer of a cloud-based system, the computer-readable media comprising:

configuring a plurality of dimensions for the service of the plurality of services, wherein:
  the plurality of dimensions are functions of the service of the plurality of services running on the application layer, and
  the plurality of dimensions is configured by a client and/or a vendor of the service of the plurality of services;
identifying a plurality of resources present in an end-user device or cloud subscriptions owned by the plurality of end-user devices of the tenant, wherein the plurality of resource within the end-user device are components, functionality and/or data is accessed by the plurality of services;
determining a resource metric that is a weight of a resource in a dimension;
receiving a plurality of policies associated with the end-user device of the plurality of end-user devices, wherein a policy of the plurality of policies is a point in a vector space;
calculating a policy metric that is a distance of the point from an origin of the vector space;
aggregating the policy of the plurality of policies and/or the dimension of the plurality of dimensions based on the policy metric associated with the dimension;
retrieving a dimension metric associated with the dimension of the plurality of dimensions, wherein:
  the dimension metric signifies a vector in the vector space, and
  the vector space comprises a plurality of vectors that indicates the plurality of dimensions of the service;
computing the exposure metric for the service of the plurality of services running on the application layer, wherein:
  the exposure metric of the service defines a status of the service, and
  the exposure metric is based on the policy metric, the resource metric, and the dimension metric of the service of the plurality of services;
storing the exposure metric of the service of the plurality of services;
determining the status of the service based on the exposure metric; and
sending an alert to inform the plurality of end-user devices about the status of the service of the plurality of services.

19. The non-transitory computer-readable media of claim 18, wherein a similarity between the plurality of services is determined by calculating a Euclidean distance between the exposure metrics of the plurality of services.

20. The non-transitory computer-readable media of claim 18, wherein a Euclidean distance between the exposure metrics of the plurality of services defines the similarity between the plurality of services in terms of their hazardous impact.

* * * * *